US011247329B2

(12) United States Patent
Isobe et al.

(10) Patent No.: US 11,247,329 B2
(45) Date of Patent: Feb. 15, 2022

(54) WORK DEVICE AND DUAL-ARM WORK DEVICE

(71) Applicant: NTN CORPORATION, Osaka (JP)

(72) Inventors: Hiroshi Isobe, Iwata (JP); Seigo Sakata, Iwata (JP); Yuuki Shimura, Iwata (JP)

(73) Assignee: NTN CORPORTION, Osaka (JP)

( * ) Notice: Subject to any disclaimer, the term of this patent is extended or adjusted under 35 U.S.C. 154(b) by 455 days.

(21) Appl. No.: 16/217,474

(22) Filed: Dec. 12, 2018

(65) Prior Publication Data

US 2019/0111561 A1  Apr. 18, 2019

Related U.S. Application Data

(63) Continuation of application No. PCT/JP2017/021112, filed on Jun. 7, 2017.

(30) Foreign Application Priority Data

Jun. 15, 2016 (JP) .............................. JP2016-118617

(51) Int. Cl.
*B25J 9/00* (2006.01)
*B25J 19/06* (2006.01)
(Continued)

(52) U.S. Cl.
CPC ............. *B25J 9/0087* (2013.01); *B25J 9/106* (2013.01); *B25J 9/123* (2013.01); *B25J 9/1676* (2013.01);
(Continued)

(58) Field of Classification Search
CPC ...... B25J 9/0048; B25J 9/023; B25J 17/0216; B25J 19/0075; B25J 19/0091; B25J 9/0087; B25J 21/00; B25J 9/123; B25J 17/0283
See application file for complete search history.

(56) References Cited

U.S. PATENT DOCUMENTS 3,888,362 A * 6/1975 Fletcher ...................... B25J 9/04
414/620
4,229,136 A * 10/1980 Panissidi .............. B25J 19/0012
414/673
(Continued)

FOREIGN PATENT DOCUMENTS

CN          101734487 A       6/2010
CN          102649272 A       8/2012
(Continued)

OTHER PUBLICATIONS

Extended European Search Report dated Dec. 16, 2019 in corresponding European Patent Application No. 17813192.6.
(Continued)

*Primary Examiner* — Joseph Brown

(57) ABSTRACT

A work device includes a work device body and a contact preventer. The work device body includes a linear motion unit having three degrees of freedom and a rotary unit having three degrees of freedom. An end effector is mounted on an output portion of the rotary unit. The contact preventer separates a working region in which the work device body is installed, from a non-working region outside the working region. The contact preventer includes: an entry allowing portion allowing an object to enter the working region therethrough; and an entry allowing portion entry detection sensor configured to detect entry of an object into the working region through the entry allowing portions.

14 Claims, 25 Drawing Sheets

(51) Int. Cl.
  *B25J 9/10* (2006.01)
  *B25J 9/12* (2006.01)
  *B25J 9/16* (2006.01)
  B25J 9/02 (2006.01)
  B25J 11/00 (2006.01)

(52) U.S. Cl.
  CPC .................. *B25J 19/06* (2013.01); *B25J 9/02* (2013.01); *B25J 11/00* (2013.01)

(56) References Cited

U.S. PATENT DOCUMENTS

| | | | | |
|---|---|---|---|---|
| 4,752,160 | A * | 6/1988 | Murray | B23Q 1/5412 29/26 A |
| 5,044,064 | A * | 9/1991 | Muselli | B25J 9/023 483/7 |
| 5,744,728 | A * | 4/1998 | Suita | B25J 19/063 73/862.542 |
| 8,447,426 | B2 | 5/2013 | Mougin et al. | |
| 8,887,893 | B2 | 11/2014 | Tsutsumi et al. | |
| 9,452,537 | B2 | 9/2016 | Nammoto et al. | |
| 2005/0036879 | A1 | 2/2005 | Jhaveri et al. | |
| 2010/0125361 | A1 | 5/2010 | Mougin et al. | |
| 2012/0163953 | A1 | 6/2012 | Murano et al. | |
| 2012/0217129 | A1 | 8/2012 | Tsutsumi et al. | |
| 2014/0207285 | A1 | 7/2014 | Sakabe | |
| 2015/0088308 | A1* | 3/2015 | Isobe | B25J 13/087 700/245 |
| 2015/0217458 | A1 | 8/2015 | Nammoto et al. | |
| 2016/0158786 | A1 | 6/2016 | Christensen | |

FOREIGN PATENT DOCUMENTS

| | | | | |
|---|---|---|---|---|
| CN | 102785239 | | 11/2012 | |
| DE | 3704952 A1 * | | 8/1988 | ............ B23Q 5/385 |
| DE | 10 2007 062 245 | | 6/2009 | |
| EP | 232548 A * | | 8/1978 | ............ B23Q 37/00 |
| JP | 61-33894 | | 2/1986 | |
| JP | 5-89337 | | 12/1993 | |
| JP | 7-178684 | | 7/1995 | |
| JP | 8-10935 | | 1/1996 | |
| JP | 8-11085 | | 1/1996 | |
| JP | 2002-336994 | | 11/2002 | |
| JP | 2004-36776 | | 2/2004 | |
| JP | 2005-329521 | | 12/2005 | |
| JP | 4528312 | | 8/2010 | |
| JP | 2014-65098 | | 4/2014 | |
| JP | 2014-87922 | | 5/2014 | |
| JP | 2014-119069 | | 6/2014 | |
| JP | 2015-55262 | | 3/2015 | |
| JP | 2015-145057 | | 8/2015 | |
| WO | WO 2005/009691 A1 | | 2/2005 | |
| WO | WO 2016/084685 A1 | | 6/2016 | |

OTHER PUBLICATIONS

International Search Report dated Aug. 29, 2017 in corresponding International Application No. PCT/JP2017/021112.
Notice of Reasons for Refusal dated Apr. 7, 2020 in Japanese Patent Application No. 2016-118617.
English Translation of the International Preliminary Report on Patentability dated Dec. 27, 2018 in corresponding International Patent Application No. PCT/JP2017/021112, 11 pages.
Chinese Office Action dated Apr. 22, 2021, in corresponding Chinese Patent Application No. 201780036825.0.
Chinese Office Action dated Sep. 6, 2021, from Chinese Patent Application No. 201780036825.0 (18 pages).

* cited by examiner

WORK DEVICE AND DUAL-ARM WORK DEVICE

CROSS REFERENCE TO THE RELATED APPLICATION

This application is a continuation application, under 35 U.S.C. § 111(a) of international patent application No. PCT/JP2017/021112, filed Jun. 7, 2017, which claims priority to Japanese patent application No. 2016-118617, filed Jun. 15, 2016, the entire disclosure of which is herein incorporated by reference as a part of this application.

BACKGROUND OF THE INVENTION

Field of the Invention

The present invention relates to a work device and a dual-arm work device for use in equipment that requires high-speed and high-accuracy work such as medical equipment and industrial equipment, equipment that requires fine work such as assembly, a robot coexisting with a person, etc.

Description of Related Art

An articulated robot type work device with six degrees of freedom is suggested in Patent Documents 1 and 2 listed below. The work device of Patent Document 1 has a single-arm configuration, and the work device of Patent Document 2 has a dual-arm configuration. These work devices are each configured with six degrees of freedom as a whole by combining six mechanisms each having one rotational degree of freedom.

RELATED DOCUMENT

Patent Document

[Patent Document 1] JP Laid-open Patent Publication No. 2005-329521
[Patent Document 2] JP Patent No. 4528312

The work device of Patent Document 1 is configured by a combination of the mechanisms all of which have one rotational degree of freedom, and thus, has the following problems 1 to 6.

(Problem 1) In the case of slightly changing the posture of an end effector mounted on a distal end or in the case of linearly moving the end effector, it is necessary to drive a plurality of motors in a cooperative manner, and thus, it is impossible to perform fine work at a high speed.

(Problem 2) Even in the case of slightly changing the posture of the end effector, not only a movement amount of a wrist joint (a joint near the end effector) but also a movement amount of an arm (a part away from the end effector) is increased. Therefore, a part of the work device is likely to come into contact with an object around the work device. In order to completely avoid such contact, it is necessary to provide a large enclosure, and thus, the occupation area is rendered to be wide.

(Problem 3) There are a plurality of solutions for one posture of the end effector in some cases, and thus, it is hard to imagine in which direction the distal end moves even when each shaft is moved in performing teaching. Therefore, knowledge and experience are required to perform manipulations.

(Problem 4) Since the range of movement is wide, it is necessary to assume contact with an object and to enhance a contact prevention function. Therefore, the entire device is rendered to be expensive.

(Problem 5) In order to avoid contact with an object, it is necessary to perform work at a reduced operation speed, or to perform work, at lower capability than a potential one, even in an operation range. Therefore, the ability cannot be fully realized.

(Problem 6) Even in the case where the contact prevention function is enhanced, an operator minds coming into contact with the work device, and thus it is difficult for a person and the work device to coexist.

The work device of Patent Document 2 is also configured by a combination of the mechanisms, all of which have one rotational degree of freedom, and thus, has the same problems as those of the work device of Patent Document 1. In addition, the work device of Patent Document 2, which is of a dual-arm type, has the following problems 7 and 8.

(Problem 7) Since the range of movement of each arm is wide, a region where the arms interfere with each other is also wide. Therefore, knowledge and experience are required to perform operation such that the arms do not come into contact with each other.

(Problem 8) Since two arms having a wide range of movement are used, the occupation area is rendered to be even wider when an enclosure is provided.

SUMMARY OF THE INVENTION

An object of the present invention is to provide a work device that can reduce an operation amount of a work device body when performing fine work, can prevent an object from coming into contact with the work device body, and can automatically perform work that is close to manual work performed by a person.

Another object of the present invention is to provide a dual-arm work device that can reduce an operation amount of a work device body when performing fine work, can prevent an object from coming into contact with the work device body, and can perform work that is similar to a work performed by a person with both hands.

A work device of the present invention has six degrees of freedom and is configured to perform work using an end effector, the work device including: a work device body; and a contact preventer configured to prevent an object from needlessly coming into contact with the work device body. The work device body includes: a linear motion unit having three degrees of freedom and obtained by combining three linear motion actuators; and a rotary unit having three degrees of freedom and obtained by combining a plurality of rotating mechanisms each having one or more rotational degrees of freedom. The linear motion unit has a base portion fixed to a mount, the rotary unit has a base portion thereof fixed to an output portion of the linear motion unit, and the end effector is mounted on an output portion of the rotary unit. The contact preventer separates a working region, which is a space in which the work device body is installed, from a non-working region that is a space outside the working region. The contact preventer has an entry allowing portion allowing an object to enter the working region therethrough from the non-working region, and an entry allowing portion entry detection sensor configured to detect entry of an object into the working region through the entry allowing portion.

In the work device body having this configuration, in performing work by the end effector, a position of the end effector is determined mainly by the linear motion unit having three degrees of freedom, and a posture of the end effector is determined by the rotary unit having three degrees of freedom. Each linear motion actuator of the linear motion unit and each rotating mechanism of the rotary unit correspond to the position of the end effector represented in a rectangular coordinate system, and the posture of the end effector represented in a polar coordinate system, respectively. Thus, operations of each linear motion actuator and each rotating mechanism with respect to the position and the posture of the end effector are easily imagined, and as a result, operation patterns for posture teaching work and the like can be easily set. In addition, an operating position of each linear motion actuator and an operating angle of each rotating mechanism are uniquely determined relative to the position and the posture of the end effector. That is, there is no singular point. Due to this, the work device can be manipulated even without proficient knowledge and experience.

Additionally, the following operation and advantageous effects (Effects 1 to 4) are achieved.

(Effect 1) In the case of performing fine work such as assembling work, the work can be performed mainly by moving only the rotary unit. Accordingly, an operation amount of the linear motion unit can be reduced, and thus, an operation amount of the entire work device body can be reduced. In addition, an area where it is necessary to install the contact preventer such as an enclosure can be narrow.

(Effect 2) Since the linear motion actuators are used in a portion that greatly influences the range of movement, the operation range can be easily limited by using a mechanical stopper or a limit sensor in accordance with work contents or the ambient environment.

(Effect 3) Since the linear motion unit and the rotary unit are separately provided, it is possible to change only either unit in the case of changing the specifications of the work device body. Accordingly, components can be shared by work device bodies having different specifications.

(Effect 4) Since the position of the end effector is determined by the linear motion actuators, a linear motion of the end effector can be accurately made at a high speed.

Moreover, the contact preventer acts as described below (Effects 5 and 6).

(Effect 5) The entry allowing portion is provided in the contact preventer, and an object cannot enter the working region through a portion other than the entry allowing portion. Thus, a range, where an object and the work device body can come into contact with each other, is limited.

(Effect 6) Since the entry detection sensor is provided, entry of an object into the working region can be assuredly detected. When the entry detection sensor has detected entry, operation of the work device body can be stopped or decelerated. Accordingly, in a state where detection of entry by the entry detection sensor is not present and an object is not close to the work device body, the work device body can be operated at a high speed, and thus, productivity is improved.

In the work device of the present invention, the contact preventer may include a plurality of face members, the plurality of face members may form a cover surrounding the work device body, and each of the plurality of face members may be parallel to two movable directions of three movable directions of the three linear motion actuators. When the contact preventer is composed of the cover having the above shape, the volume of the internal space of the cover and the volume of a region where movable portions of the work device body move, can be substantially equal to each other. Therefore, even when the contact preventer is provided, the configuration of the work device can be compact. An object does not come into contact with the work device body through a portion other than the entry allowing portion, and thus an operator can perform work at ease even in the vicinity of the work device.

In the work device of the present invention, lengths of the entry allowing portion in the movable directions of the two linear motion actuators parallel to a plane on which the entry allowing portion is present may be smaller than ranges of movement of the two linear motion actuators, respectively. With this configuration, an object cannot enter between the cover and the work device body, and thus, contact between the work device body and an object can be assuredly prevented.

In the work device of the present invention, at least one of the plurality of rotating mechanisms of the rotary unit may be a link actuating device having two degrees of freedom. The link actuating device includes: a proximal end side link hub; and a distal end side link hub coupled to the proximal end side link hub via three or more link mechanisms such that a posture of the distal end side link hub can be changed relative to the proximal end side link hub. Each of the link mechanisms has a proximal side end link member having one end rotatably coupled to the proximal end side link hub, a distal side end link member having one end rotatably coupled to the distal end side link hub, and an intermediate link member having opposite ends rotatably coupled to other ends of the proximal side and distal side end link members, respectively. A posture control actuator configured to arbitrarily change the posture of the distal end side link hub relative to the proximal end side link hub may be provided to each of two or more link mechanisms of the three or more link mechanisms.

In the link actuating device, the proximal end side link hub, the distal end side link hub, and the three or more link mechanisms cooperate together to form a two-degrees-of-freedom mechanism in which the distal end side link hub is rotatable about two mutually orthogonal axes relative to the proximal end side link hub. This two-degrees-of-freedom mechanism is compact in size, but can achieve a wide range of movement for the distal end side link hub. For example, the maximum value of the bending angle between an axis or center line of the proximal end side link hub and an axis or center line of the distal end side link hub is about ±90°, and the turning angle of the distal end side link hub relative to the proximal end side link hub can be set in the range of 0° to 360°. In addition, in the operation range of a bending angle of 90° and a turning angle of 360°, smooth operation can be performed without any singular point.

As described above, by using the link actuating device, which can smoothly operate in a wide range of movement, as the rotary unit, fine work can be performed at a high speed. In addition, the link actuating device has a compact configuration but has a wide range of movement, and thus, the entire configuration of the work device is rendered to be compact.

In the case where the rotary unit includes the link actuating device, the posture control actuator may have a torque detector, and a contact detector may be provided to detect contact of an object with the rotary unit on the basis of a detection signal from the torque detector. The link actuating device is configured to be smoothly movable in all directions within the range of movement thereof without any singular point. Thus, even when foreign matter comes into contact with the distal end side link hub from various directions, torque is assuredly transmitted to each posture control actuator. Accordingly, the torque detector can detect torque in various directions, and thus, the contact detector can accurately detect contact of an object. As described above, by using the torque detector, which is provided in each posture control actuator, for detecting contact, the necessity to provide another sensor for contact detection is eliminated. As a result, the work device body is made compact and reduced in cost.

In the case where the rotary unit includes the link actuating device, an entry prevention cover may be provided to prevent an object from entering an internal space between the proximal end side link hub and the distal end side link hub. By using the entry prevention cover, an object can be prevented from entering the internal space by mistake.

In the work device of the present invention, a cushioning material may be provided to the rotary unit, which cushioning material alleviates shock when coming into contact with an object. According to this configuration, an object can enter the working region only through the entry allowing portion of the contact preventer. Therefore, a portion of the work device body, which may come into contact with an object, is substantially limited to the rotary unit. Thus, when the cushioning material is provided only to the rotary unit, an object can be protected. Accordingly, installation of a facility for contact prevention can be minimized, and the entire device is rendered to be inexpensive.

In the present invention, each of the linear motion actuators of the linear motion unit may have a stage including an advancing/retracting portion, which stage is disposed so as to be directed toward an outer side with respect to a working space in which work is performed by the end effector. By disposing the stage of each linear motion actuator such that the stage is directed toward the outer side relative to the working space, the working space can be wide, and also, the possibility of coming into contact with an object when the object has entered the working space can be reduced.

In the present invention, a control device may be provided to perform control so as to decrease an operation speed of the work device body or stop operation of the work device body when the entry detection sensor detects entry of an object into the working region. According to this configuration, operation of the work device body is controlled by the control device, according to a detection result of the entry detection sensor. Thus, the operator can perform work of carrying a workpiece into/out of the working region or assisting work for the work device body at ease.

In the present invention, the contact preventer may include: at least one workpiece carrying-in/out portion configure to carry in/out a workpiece between the working region and the non-working region; and a workpiece carrying-in/out portion entry detection sensor configured to detect entry of an object into the working region through the workpiece carrying-in/out portion.

When the contact preventer includes the workpiece carrying-in/out portion, the work device body can be installed on a device for carrying a workpiece into/out of the working region, for example, on a line of a conveyor device. A hand is put into the working region through the entry allowing portion when performing assisting work for the work device body. Thus, normally, an object does not enter the working region through the workpiece carrying-in/out portion. Therefore, by providing the entry detection sensor, it is possible to detect an abnormal situation in which an object has entered the working region through the workpiece carrying-in/out portion. Accordingly, it is possible to take prompt action.

A dual-arm work device of the present invention includes: two work device bodies each having six degrees of freedom and configured to perform work by using an end effector, the two work device bodies being aligned so as to be geometrically symmetrical with each other; and a contact preventer configured to prevent an object from needlessly coming into contact with any of the two work device bodies. Each of the work device bodies includes: a linear motion unit having three degrees of freedom and obtained by combining three linear motion actuators; and a rotary unit having three degrees of freedom and obtained by combining a plurality of rotating mechanisms each having one or more rotational degrees of freedom. The linear motion unit has a base portion fixed to a mount, the rotary unit has a base portion thereof fixed to an output portion of the linear motion unit, and the end effector is mounted on an output portion of the rotary unit. The contact preventer separates a working region, which is a space in which the two work device bodies are installed, from a non-working region that is a space outside the working region. The contact preventer has an entry allowing portion allowing an object to enter the working region therethrough from the non-working region, and an entry allowing portion entry detection sensor configured to detect entry of an object into the working region through the entry allowing portion.

The two work device bodies of the dual-arm work device having this configuration, also, achieve the same advantageous effects as the above-described work device body of the work device of the present invention. Since the two work device bodies are aligned in the dual-arm work device, the dual-arm work device can perform work that is performed with both hands by a person. Accordingly, work that is performed as a substitute for a person, in particular, work such as assembly of components, can be performed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments of the present invention will be described with reference to the drawings.

Figure 1:
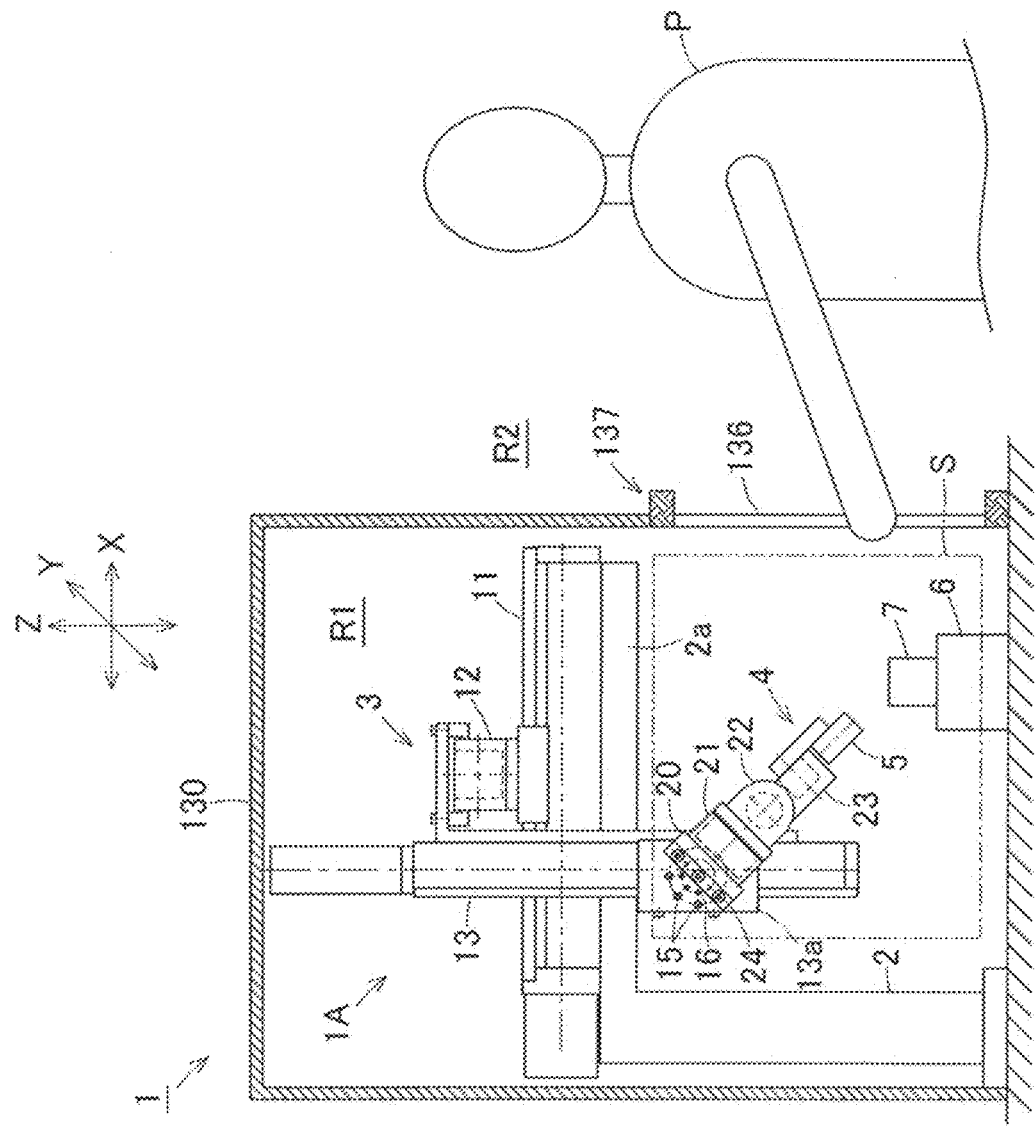
FIG. 1 is a front view representing a part of a work device according to a first embodiment of the present invention in a cross-section.

FIG. 1 to FIG. 5 show a work device according to a first embodiment of the present invention. As shown in FIG. 1 illustrating a schematic configuration, the work device 1 includes a work device body 1A and a cover 130 that surrounds the work device body 1A. The cover 130 forms a contact preventer that prevents an object from needlessly coming into contact with the work device body 1A.

The work device body 1A includes: a mount 2; a linear motion unit 3 having a base portion fixed to the mount 2; a rotary unit 4 having a base portion thereof fixed to an output portion of the linear motion unit 3; and an end effector 5 that is mounted on an output portion of the rotary unit 4. The end effector 5 performs work on a workpiece 7 placed on the workpiece placement table 6. The end effector 5 may perform work on the workpiece 7 in a contact manner, or may perform work on the workpiece 7 in a non-contact manner. Work on the workpiece 7 by the end effector 5 is enabled within a working space S.

The linear motion unit 3 has a configuration with three degrees of freedom in which three linear motion actuators are combined. The rotary unit 4 has a configuration with three degrees of freedom in which a plurality of rotating mechanisms each having one or more rotational degrees of freedom are combined. In this embodiment, the rotary unit 4 is configured by combining three rotating mechanisms each having one degree of freedom. Thus, the work device body 1A has a configuration with six degrees of freedom as a whole.

Figure 2A:
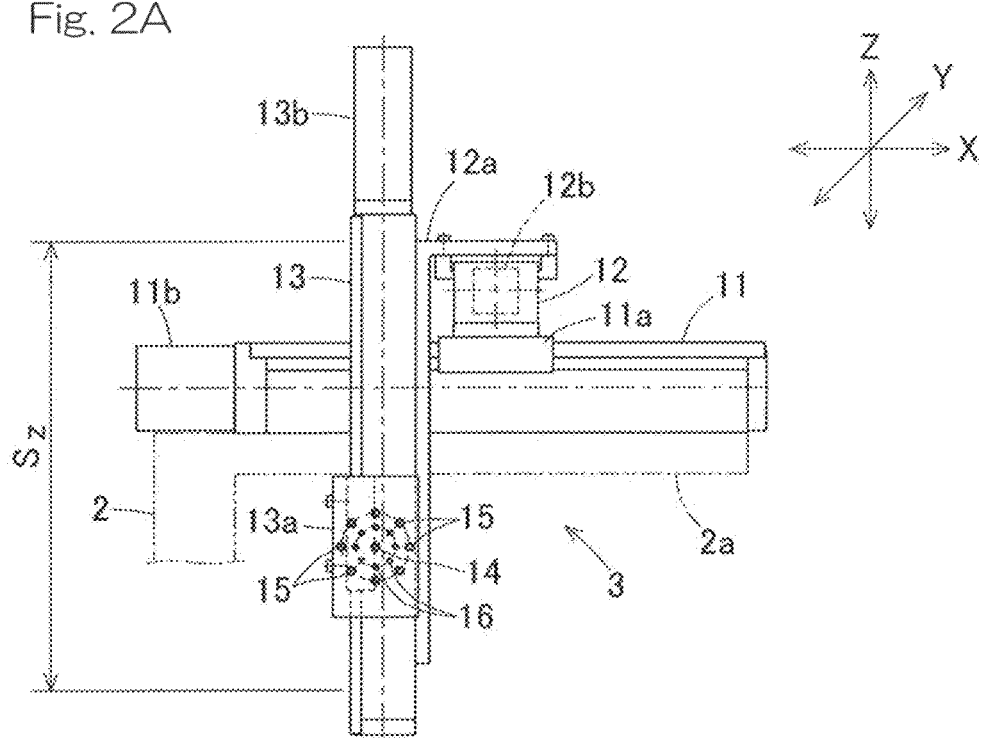
FIG. 2A is a front view of a linear motion unit of a work device body of the work device.
Figure 2B:
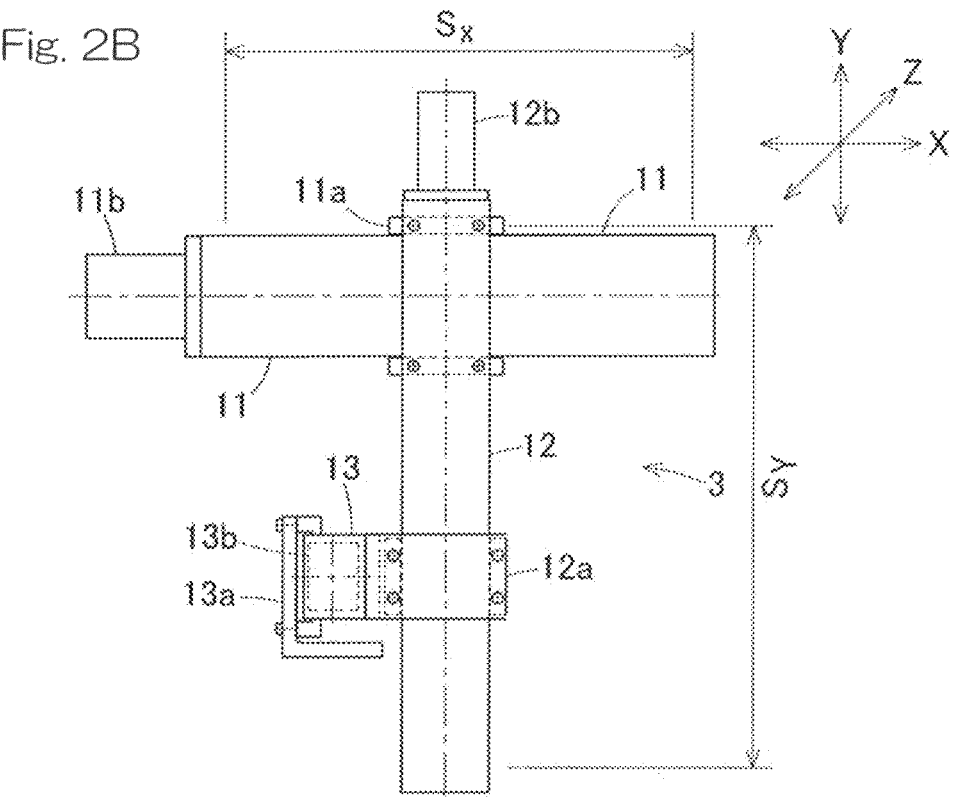
FIG. 2B is a plan view of the linear motion unit of the work device body of the work device.

FIG. 2A and FIG. 2B are a front view and a plan view of the linear motion unit 3, respectively. The linear motion unit 3 includes a first linear motion actuator 11, a second linear motion actuator 12, and a third linear motion actuator 13. The first linear motion actuator 11 is mounted on a horizontal portion 2a of the mount 2, and includes a stage 11a which advances/retracts in the right-left direction (an X-axis direction) (an effective stroke sX). The second linear motion actuator 12 is mounted on the stage 11a of the first linear motion actuator 11, and includes a stage 12a which advances/retracts in the front-rear direction (a Y-axis direction) (an effective stroke sY).

The third linear motion actuator 13 is mounted on the stage 12a of the second linear motion actuator 12, and includes a stage 13a which advances/retracts in a vertical direction (a Z-axis direction) (an effective stroke sZ). The respective linear motion actuators 11, 12 and 13 are electric actuators having motors 11b, 12b and 13b as drive sources. The respective linear motion actuators 11, 12 and 13 are disposed such that the stages 11a, 12a and 13a thereof are directed toward the outer side relative to the working space S (FIG. 1). The base portion, of the linear motion unit 3, that is fixed to the mount 2 refers to a portion, of the first linear motion actuator 11, that does not advance/retract. In addition, the output portion, of the linear motion unit 3, to which the base portion of the rotary unit 4 is fixed, refers to the stage 13a of the third linear motion actuator 13.

Figure 3A:
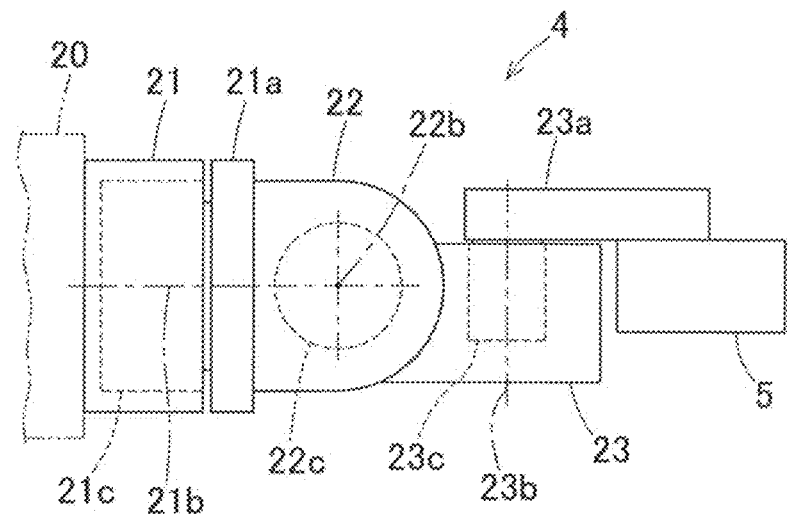
FIG. 3A is a front view of a rotary unit of the work device body.
Figure 3B:
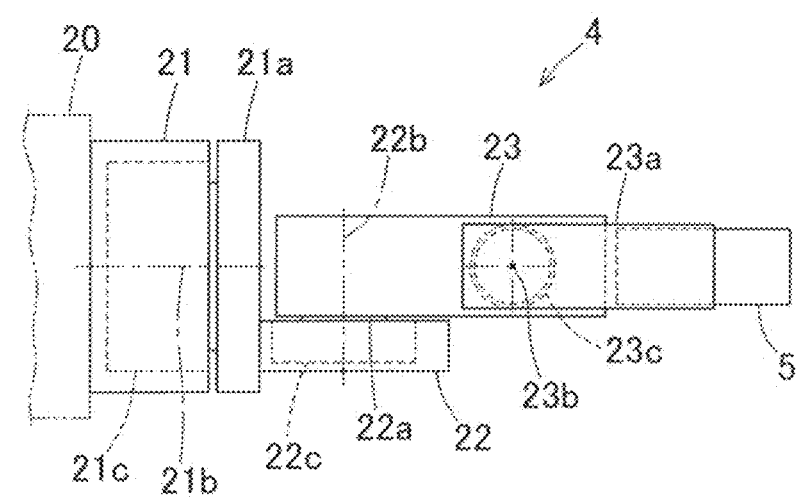
FIG. 3B is a plan view of the rotary unit of the work device body.

FIG. 3A and FIG. 3B are a front view and a plan view of the rotary unit 4, respectively. The rotary unit 4 includes: a rotary unit mounting member 20 that is fixed to the output portion of the linear motion unit 3 (FIG. 1); a first rotating mechanism 21 that is mounted on the rotary unit mounting member 20; a second rotating mechanism 22 that is mounted on a rotating portion 21a of the first rotating mechanism 21; and a third rotating mechanism 23 that is mounted on a rotating portion 22a of the second rotating mechanism 22. The rotation axes 21b, 22b and 23b of the first to third rotating mechanisms 21, 22 and 23 are orthogonal to each other. Rotational drive sources of the respective rotating mechanisms 21, 22 and 23 are, for example, motors 21c, 22c and 23c. The base portion, of the rotary unit 4, that is fixed to the output portion of the linear motion unit 3, refers to the rotary unit mounting member 20. In addition, the output portion, of the rotary unit 4, on which the end effector 5 is mounted, refers to a rotating portion 23a of the third rotating mechanism 23.

As shown in FIG. 2A, screw holes 14, 15 and a positioning hole 16, which holes 14-16 are used for fixing the rotary unit mounting member 20, are provided in the stage 13a of the third linear motion actuator 13, which forms the output portion of the linear motion unit 3. The only one screw hole 14 is provided at a center portion of an area to which the rotary unit mounting member 20 is fixed. A plurality of screw holes 15 are arranged on the circumference of a circle having a center at the screw hole 14. The number of the positioning hole 16 is equal to the number of the screw holes 15, and the positioning holes 16 are arranged on the circumference of a circle that has a center at the screw hole 14 and has a smaller diameter than that for the screw holes 15. The rotary unit mounting member 20 is provided with: three bolt insertion holes (not shown) that are aligned in a straight line corresponding to the screw hole 14 and two screw holes 15; and two positioning projections (not shown) corresponding to the positioning holes 16.

A procedure for fixing the rotary unit mounting member 20 to the stage 13a, which forms the output portion of the third linear motion actuator 13, will be described. First, the two positioning projections of the rotary unit mounting member 20 are brought into engagement with the two positioning holes 16 of the stage 13a. Accordingly, the angle of the rotary unit mounting member 20 relative to the stage 13a in a front view is determined.

In this state, as shown in FIG. 1, mounting bolts 24 are inserted into the respective three bolt insertion holes of the rotary unit mounting member 20 and is, then, screwed into the screw hole 14 at the center portion and the two screw holes 15 of the stage 13a. By so doing, the rotary unit mounting member 20 is fixed to the stage 13a. The mounting angle of the base portion of the rotary unit 4 relative to the output portion of the linear motion unit 3 can be changed by changing the positioning holes 16 of the stage 13a with which the positioning projections of the rotary unit mounting member 20 are brought into engagement.

Operation of the work device body 1A will be described.

According to this configuration, a position of the end effector 5 is determined mainly by the linear motion unit 3 having three degrees of freedom, and a posture of the end effector 5 is determined by the rotary unit 4 having three degrees of freedom. The respective linear motion actuators 11, 12 and 13 of the linear motion unit 3 correspond to the position of the end effector 5 represented in a rectangular coordinate system. In addition, the respective rotating mechanisms 21, 22 and 23 of the rotary unit 4 correspond to the posture of the end effector 5 represented in a polar coordinate system. Thus, operations of the respective linear motion actuators 11, 12 and 13 with respect to the position of the end effector 5 and operations of the respective rotating mechanisms 21, 22 and 23 with respect to the posture of the end effector 5 are easily imagined. Therefore, operation patterns for posture teaching work and the like can be easily set.

Operating positions of the respective linear motion actuators 11, 12 and 13 and operating angles of the respective rotating mechanisms 21, 22 and 23 are uniquely determined with respect to the position and the posture of the end effector 5. That is, there is no singular point. Due to this, the work device body 1A can be manipulated even without proficient knowledge and experience.

In the case of performing fine work such as assembling work on the workpiece 7 by using the end effector 5, the work can be performed mainly by moving only the rotary unit 4. Thus, an operation amount of the linear motion unit 3 can be reduced, and the range of movement of the entire work device body 1A can be reduced. In addition, the installation area for the cover 130 can be decreased.

Since the position of the end effector 5 is determined by the linear motion actuators 11, 12 and 13, a linear motion of the end effector 5 can be accurately made at a high speed. In addition, the linear motion actuators 11, 12 and 13 are used in a portion that greatly influences the range of movement. Thus, the operation range can be easily limited by using a mechanical stopper or a limit sensor in accordance with work contents or the ambient environment.

The respective linear motion actuators 11, 12 and 13 of the linear motion unit 3 are disposed such that the stages 11a, 12a and 13a, which form advancing/retracting portions thereof, are directed toward the outer side relative to the working space S. Accordingly, the working space S can be wide. In addition, a possibility that an object comes into contact with the work device body 1A when the object has entered the working space S, can be reduced.

Since the linear motion unit 3 and the rotary unit 4 are separately provided, it is possible to change only either unit in the case of changing the specifications of the work device body 1A. For example, the rotary unit 4 can be changed from the form shown in FIGS. 3A and 3B to a form shown in FIG. 11 described later, a form shown in FIG. 17 described later, a form shown in FIG. 19 described later, or the like. Accordingly, components can be shared by work device bodies 1A having different specifications.

The rotary unit mounting member 20, which forms the base portion of the rotary unit 4, is mounted on the stage 13a of the third linear motion actuator 13, which forms the output portion of the linear motion unit 3, by the mounting bolts 24 such that the mounting angle of the rotary unit mounting member 20 can be changed. Thus, the device configuration can be easily changed in accordance with work contents or the ambient environment.

As described above, when the work device body 1A performs fine work, an operation amount of the entire work device body 1A is small. Thus, contact of the work device body 1A with an object can be easily avoided. Therefore, work that is close to manual work performed by a person can be automatically performed. In addition, it is possible to shorten a set-up change time and an adjustment time, and high-speed operation can be performed. Thus, productivity is improved.

Figure 4:
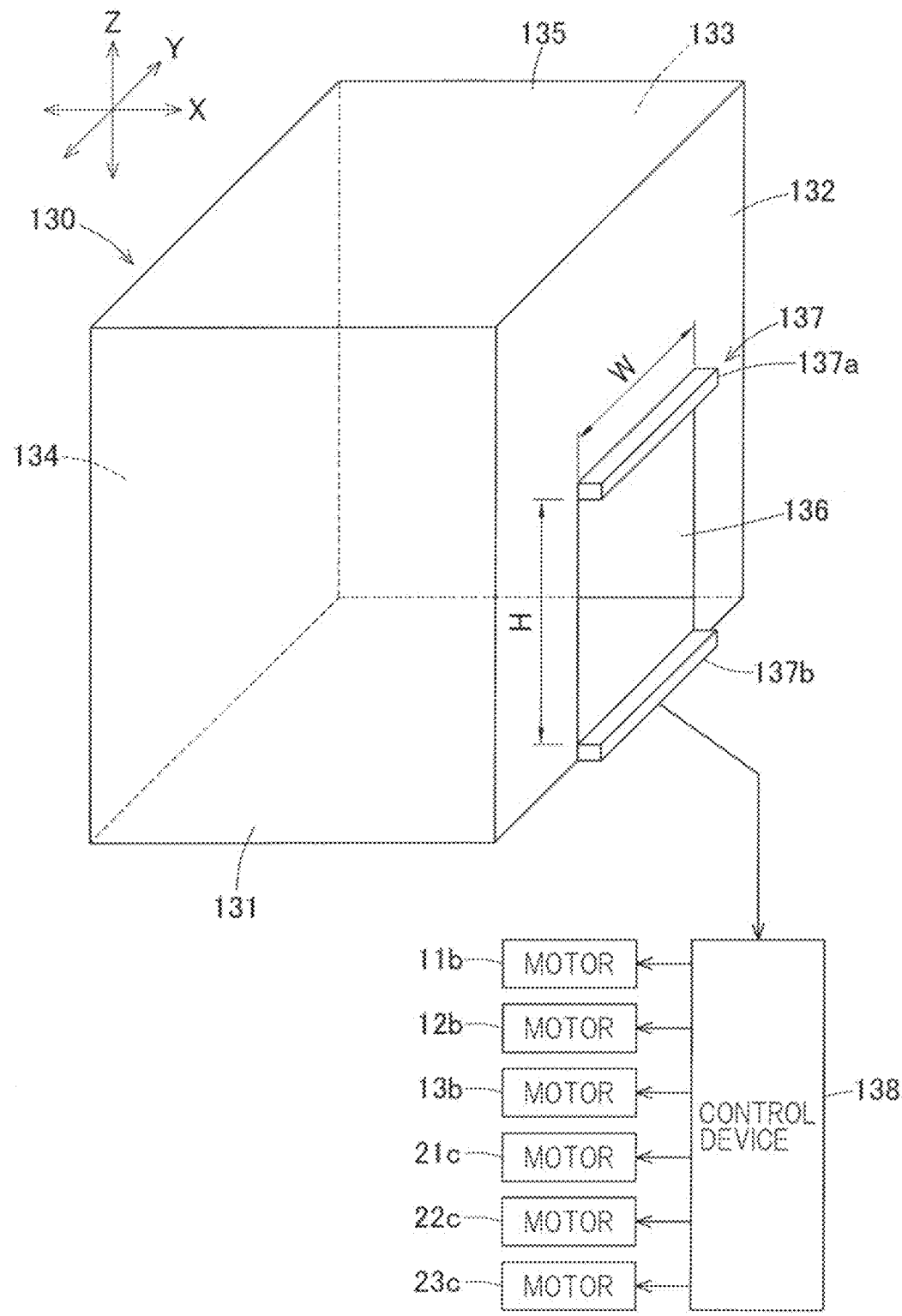
FIG. 4 is an external perspective view of a contact preventer, composed of a cover, of the work device, wherein a block diagram of a control system is added.

As shown in FIG. 4, the cover 130 includes four erected face members (face members) 131, 132, 133 and 134, and one top face member (face member) 135. That is, the cover 130 has a rectangular parallelepiped shape that is open at a lower surface. These face members 131 to 135 are disposed such that two adjacent face members are orthogonal to each other. By the cover 130 surrounding the work device body 1A, a working region R1 shown in FIG. 1 is separated from a non-working region R2 (FIG. 1). The working region R1 is a space in which the work device body 1A is installed. The non-working region R2 is a space outside the working region R1.

In the cover 130 shown in FIG. 4, the four erected face members 131 to 134 and the one top face member 135 are installed such that each face member is parallel to two movable directions of movable directions of the three linear motion actuators 11, 12 and 13 (FIG. 1). Specifically, the erected face members 131 and 133 are parallel to the movable directions of the first linear motion actuator 11 and the third linear motion actuator 13 (the X-axis direction, the Z-axis direction). In addition, the erected face members 132 and 134 are parallel to the movable directions of the second linear motion actuator 12 and the third linear motion actuator 13 (the Y-axis direction, the Z-axis direction). Furthermore, the top face member 135 is parallel to the movable directions of the first linear motion actuator 11 and the second linear motion actuator 12 (the X-axis direction, the Y-axis direction).

An entry allowing portion 136, that allows an object or a hand of an operator P to enter the working region R1 therethrough from the non-working region R2, is provided in a lower portion of the erected face member 132 which faces sideways. The entry allowing portion 136 is composed of a rectangular opening. A height dimension H of the entry allowing portion 136 is smaller than the range of movement of the third linear motion actuator 13 (the effective stroke sZ (FIG. 2)). In addition, a width dimension W of the entry allowing portion 136 is smaller than the range of movement of the second linear motion actuator 12 (the effective stroke sY (FIG. 2)).

An entry allowing portion entry detection sensor 137 is provided to the cover 130. The entry detection sensor 137 detects entry of an object into the working region R1 through the entry allowing portion 136. The entry detection sensor 137 is, for example, an optical type sensor having a light-emitting portion 137a and a light-receiving portion 137b arranged on the upper end and the lower end of the entry allowing portion 136, respectively. The entry detection sensor 137 is electrically connected to a control device 138. The control device 138 is, for example, of a computer numerical control type. When the entry detection sensor 137 detects entry, the control device 138 limits drive of the motors 11b, 12b, and 13b of the linear motion unit 3 and drive of the motors 21c, 22c and 23c of the rotary unit 4.

Figure 5:
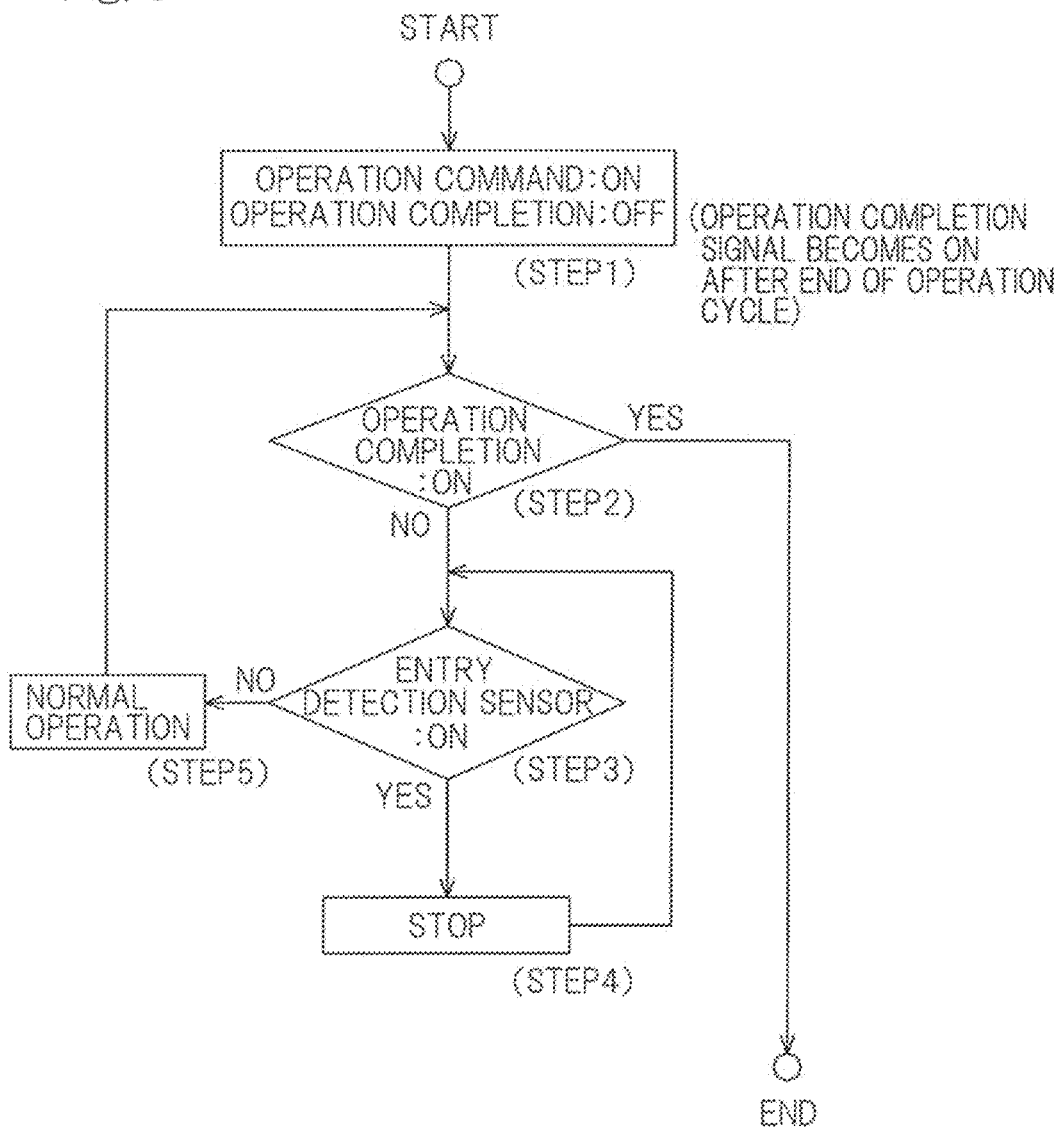
FIG. 5 is a flowchart of an example of control by a control device of the control system.

FIG. 5 is a flowchart showing an example of control by the control device 138. In the initial state, an operation command is OFF, and operation completion is ON. The operation command and a signal of the operation completion are outputted through a switch operation or the like by the operator. When the operation command becomes ON from the initial state (the operation completion becomes OFF), the work device body 1A starts operating (step 1).

During operation of the work device body 1A, it is determined whether the operation completion is ON (step 2). When the operation completion is ON, operation of the work device body 1A is stopped to end work. When the operation completion is not ON, operation of the work device body 1A is continued.

During operation of the work device body 1A, it is determined whether the entry detection sensor 137 is ON (step 3). When the entry detection sensor 137 is ON, operation of the work device body 1A is stopped (step 4). When the entry detection sensor 137 is not ON, normal operation of the work device body 1A is continued (step 5). The normal operation refers to operation in which commanded operation is performed at a commanded speed. Even when the entry detection sensor 137 becomes ON and operation of the work device body 1A is stopped, if the entry detection sensor 137 becomes no longer ON, operation of the work device body 1A is restarted (step 5).

That is, according to the control shown in FIG. 5, when an object has entered the working region R1 (FIG. 1) through the entry allowing portion 136, an operation cycle of the work device body 1A is stopped. By performing such control, the work device body 1A is maintained in a stop state, when work of carrying the workpiece 7 into/out of the working region R1 or assisting work for the work device body 1A is performed. Thus, such work can be performed at ease. In addition, even when an object has entered the working region R1 through the entry allowing portion 136 during operation of the work device body 1A, the entry detection sensor 137 becomes ON (step 3), and the work device body 1A automatically stops (step 4). Thus, contact between the object and the work device body 1A can be prevented. Thereafter, when the object is taken out of the working region R1, the entry detection sensor 137 becomes OFF (step 3), and the work device body 1A restarts operating (step 5).

Figure 6:
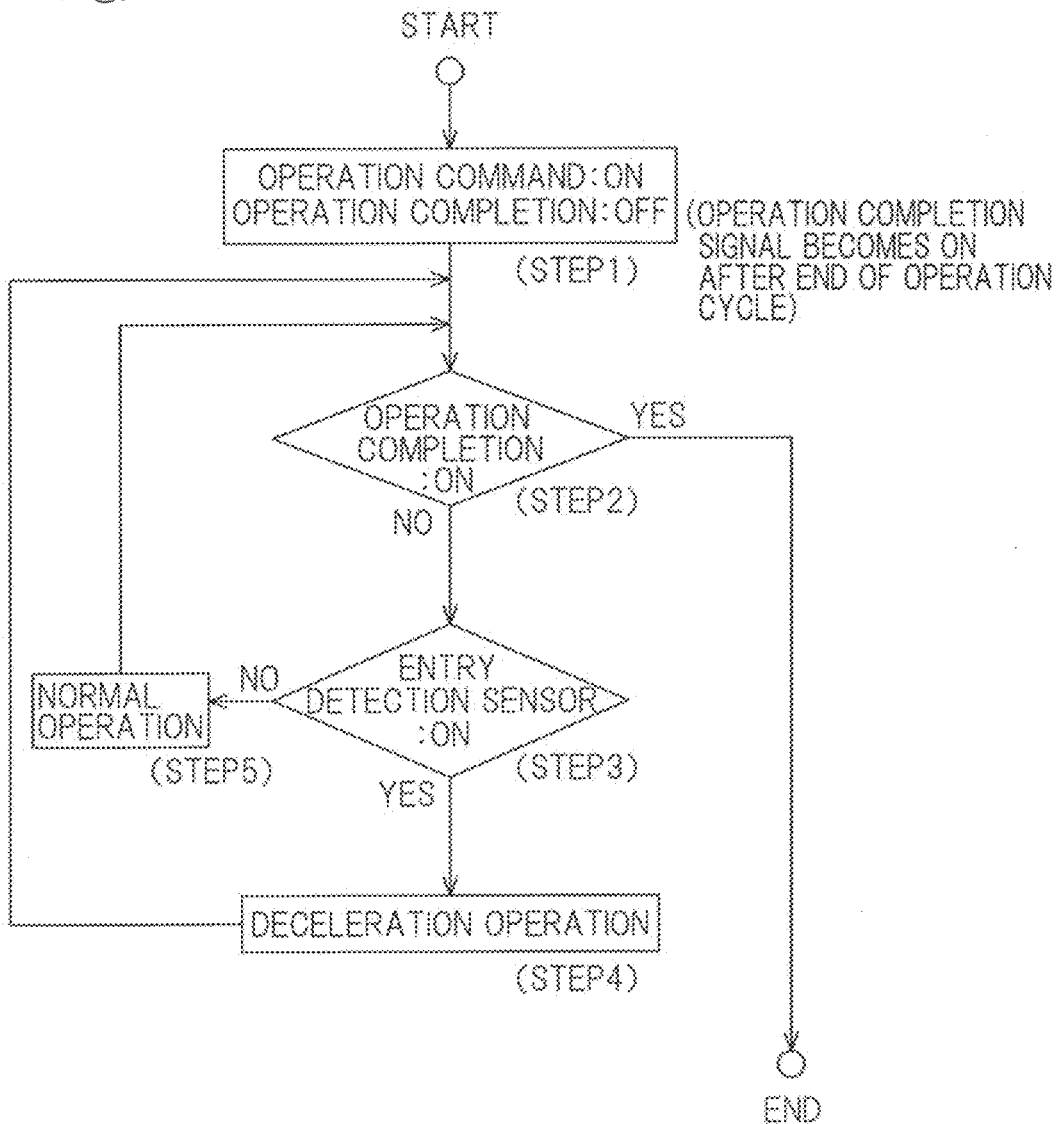
FIG. 6 is a flowchart of another example of control by the control device of the control system.

FIG. 6 is a flowchart showing another example of control by the control device 138. In this control, when the entry detection sensor 137 is ON (step 3), operation of the work device body 1A is not stopped as in FIG. 5, but operation of the work device body 1A is decelerated (step 4). After operation of the work device body 1A is decelerated, when the entry detection sensor 137 becomes no longer ON, the work device body 1A is returned to normal operation (step 5). However, during deceleration, if the operation completion signal becomes ON (YES in step 2), operation of the work device body 1A is stopped to end work. The other control is the same as in FIG. 5.

That is, according to the control shown in FIG. 6, when an object has entered the working region R1 (FIG. 1) through the entry allowing portion 136, operation of the work device body 1A is decelerated. By performing such control, work of carrying the workpiece 7 into/out of the working region R1 or assisting work for the work device body 1 can be performed at ease, similar to the control shown in FIG. 5.

In the cover 130 shown in FIG. 4, each of the four erected face members 131, 132, 133 and 134 and the one top face member 135 is parallel to two movable directions of the movable directions of the three linear motion actuators 11, 12 and 13. Thus, the volume of the internal space of the cover 130 and the volume of a region where movable portions of the work device body 1A move, can be substantially equal to each other. Therefore, even when the cover 130 is provided, the configuration of the work device 1 can be compact. In addition, an object does not come into contact with the work device body 1A through a portion other than the entry allowing portion 136, and thus the operator can perform work at ease even when the operator is in the vicinity of the work device.

In the present embodiment, the movable directions of the three linear motion actuators 11 to 13 are orthogonal to each other, and the cover 130 has the four erected face members 131 to 134 and the one top face member 135 which are disposed such that two adjacent face members are orthogonal to each other. However, the configurations of the three linear motion actuators 11 to 13 and the cover 130 are not limited thereto. Specifically, the movable directions of the three linear motion actuators 11 to 13 do not have to be orthogonal to each other. In this case, the four erected face members 131 to 134 and the one top face member 135 each only need to be parallel to two movable directions of the movable directions of the three linear motion actuators 11 to 13 and to be disposed so as to surround the work device body 1A. Even with such a configuration, the volume of the internal space of the cover 130 and the volume of the region where the movable portions of the work device body 1A move, can be substantially equal to each other. Therefore, the configuration of the work device 1 can be compact.

Furthermore, the height dimension H of the entry allowing portion 136 is set to be smaller than the range of movement of the third linear motion actuator 13 (the effective stroke sZ), and the width dimension W of the entry allowing portion 136 is set to be smaller than the range of movement of the second linear motion actuator 12 (the effective stroke sY). Thus, an object does not enter between the cover 130 and the work device body 1A.

Figure 7:
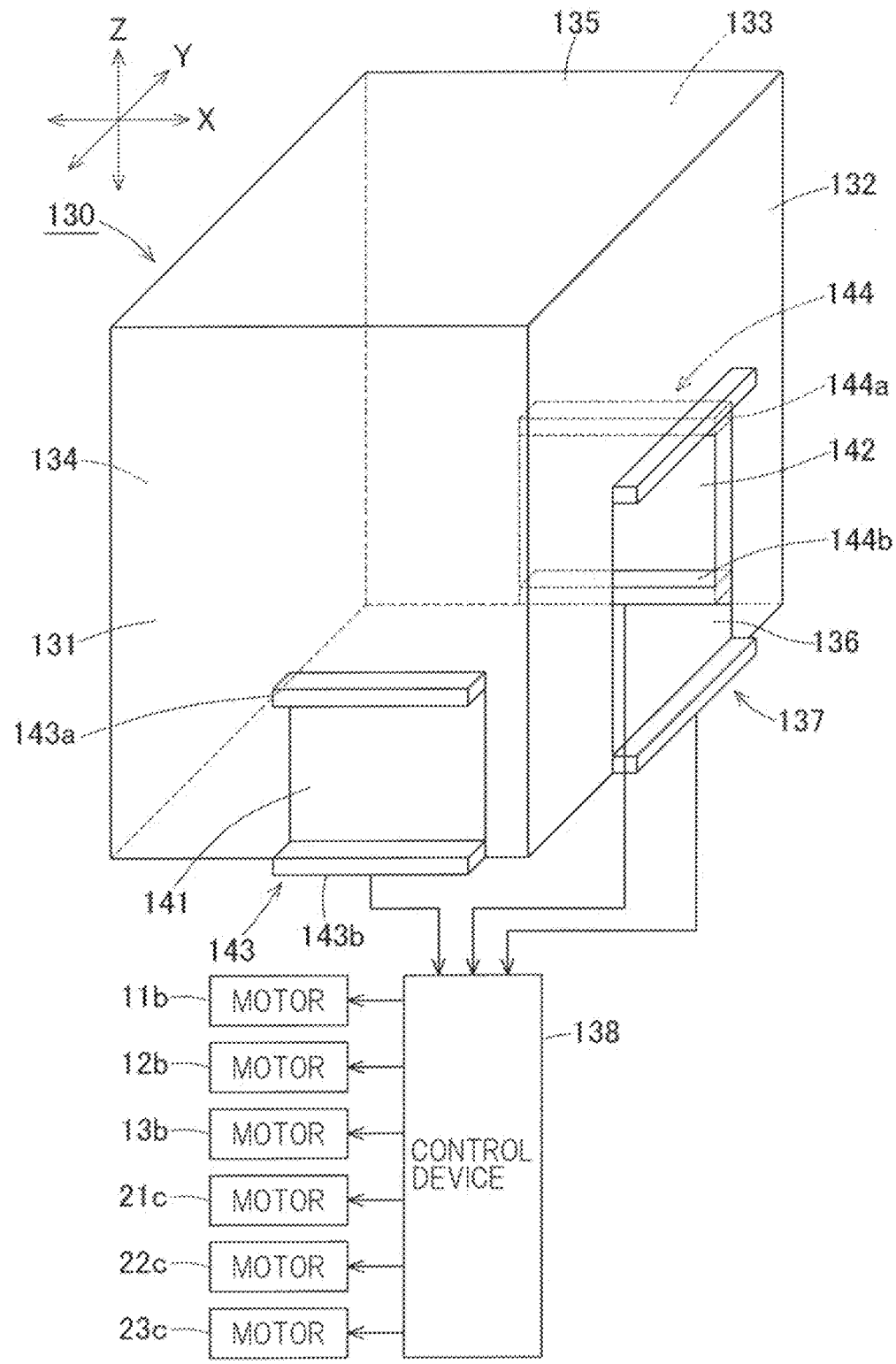
FIG. 7 is an external perspective view of another contact preventer composed of a cover, wherein a block diagram of a control system is added.

FIG. 7 shows another example of the contact preventer composed of the cover. In the cover 130 shown in FIG. 7, two workpiece carrying-in/out portions 141 and 142 are provided in addition to the entry allowing portion 136. The two workpiece carrying-in/out portions 141 and 142 are provided in lower portions of the erected face members 131 and 133, respectively, which are orthogonal to the erected face member 132 provided with the entry allowing portion 136 and face each other. The workpiece carrying-in/out portions 141 and 142 are provided such that the positions thereof coincide with each other in the right-left direction (the X-axis direction) and the vertical direction (the Z-axis direction).

When the workpiece carrying-in/out portions 141 and 142 are provided, a device for carrying a workpiece into/out of the working region R1 (FIG. 1) within the cover 130 (for example, a conveyor device) can be installed so as to extend through the workpiece carrying-in/out portions 141 and 142. The work device body 1A (FIG. 1) can be installed on a line of the conveyor device.

Workpiece carrying-in/out portion entry detection sensors 143 and 144, each of which detects entry of an object into the working region R1 through the workpiece carrying-in/out portion 141 or 142, may be provided to the workpiece carrying-in/out portions 141 and 142. The workpiece carrying-in/out portion entry detection sensors 143 and 144 are, for example, optical type sensors having light-emitting portions 143a, 144a and light-receiving portions 143b, 144b. Similar to the entry detection sensor 137, the workpiece carrying-in/out portion entry detection sensors 143 and 144 are, also, electrically connected to the control device 138.

Figure 8:
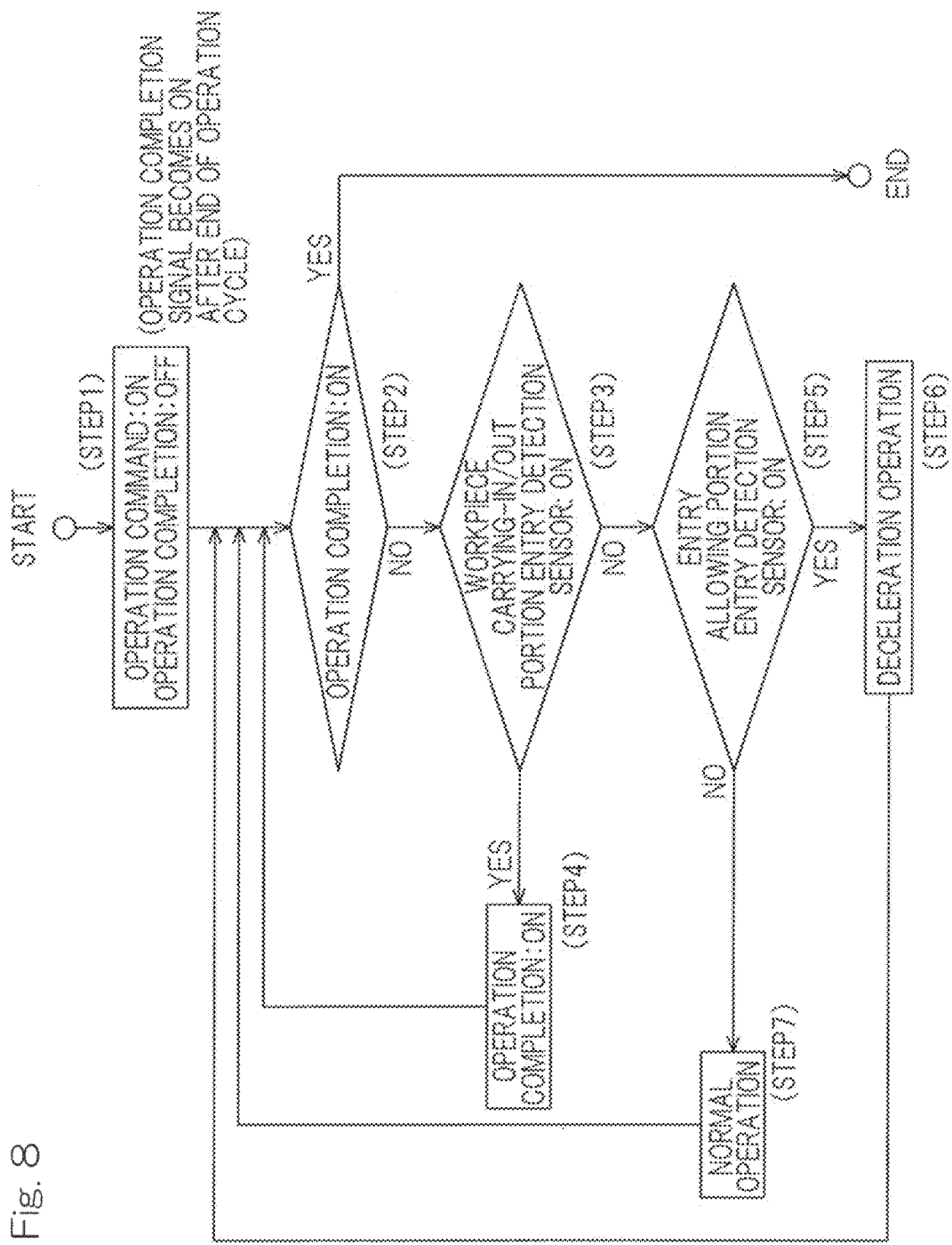
FIG. 8 is a flowchart of an example of control by the control device of the control system.

FIG. 8 is a flowchart showing an example of control by the control device 138. In this control, a process of determining whether the workpiece carrying-in/out portion entry detection sensors 143 and 144 are ON (step 3) is added between step 2 and step 3 shown in FIG. 6. When at least one of the entry detection sensors 143 and 144 is ON in this step 3, the operation completion is set to be ON (step 4), and work is ended. When both of the entry detection sensors 143 and 144 are OFF, it is determined whether the entry detection sensor 137 is ON (step 5). Similar to the control shown in FIG. 6, when the entry detection sensor 137 is ON, operation of the work device body 1A is decelerated (step 6). When the entry detection sensor 137 is OFF, normal operation of the work device body 1A is continued (step 7).

According to the control shown in FIG. 8, when an object has entered the working region R1 (FIG. 1) through the entry allowing portion 136, operation of the work device body 1A is decelerated. Furthermore, when an object has entered the working region R1 through the workpiece carrying-in/out portion 141 or 142, an operation cycle of the work device body 1A is stopped. A hand is put into the working region R1 through the entry allowing portion 136, so as to perform assisting work for the work device body 1A. Therefore, normally, an object does not enter the working region R1 through the workpiece carrying-in/out portion 141 or 142. Thus, by providing the entry detection sensors 143 and 144, it is possible to detect an abnormal situation in which an object has entered the working region R1 through the workpiece carrying-in/out portion 141 or 142. Accordingly, it is possible to take prompt action of stopping an operation cycle of the work device body 1A.

Figure 9:
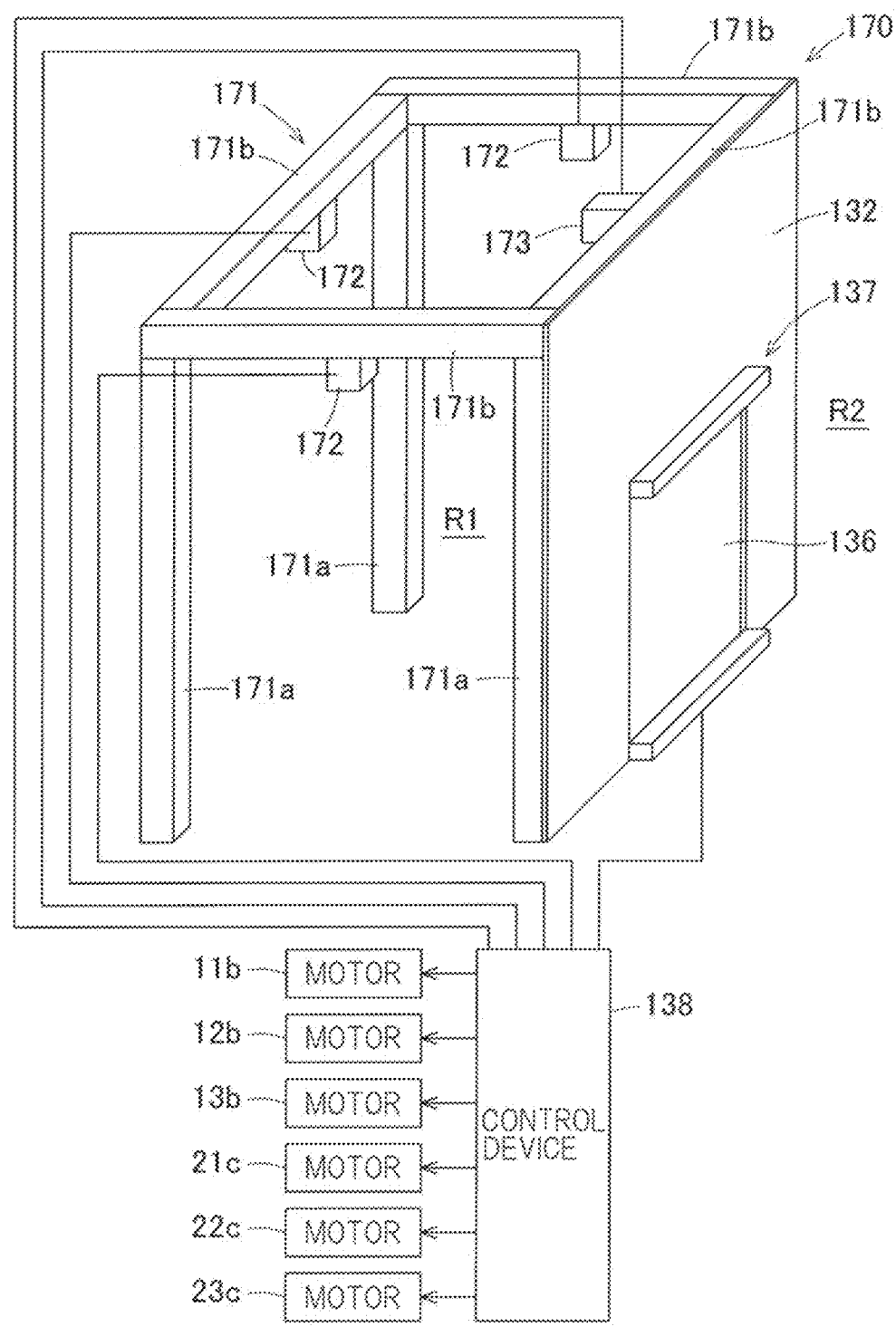
FIG. 9 is an external perspective view of yet another contact preventer, wherein a block diagram of a control system is added.

FIG. 9 shows the configuration of another contact preventer. The contact preventer 170 does not fully surround the working region R1, but is in a form in which boundary portions between the working region R1 and the non-working region R2 are opened. Specifically, a frame 171 having a rectangular parallelepiped shape is formed by combining a plurality of rods, and the working region R1 is formed within the frame 171. The frame 171 has: four vertical members 171a that are erected at the corners of a rectangle in a plan view; and four horizontal members 171b that extend on and between the upper ends of the adjacent vertical members 171a. An erected face member 132 is mounted on the erected face of the frame 171 at the front side as seen from the operator's perspective. An entry allowing portion 136, that allows an object to enter the working region R1 therethrough, is provided in a lower portion of the erected face member 132.

An entry allowing portion entry detection sensor 137, which detects entry of an object into the working region R1 through the entry allowing portion 136, is provided to the entry allowing portion 136. In addition, opened portion entry detection sensors 172 and 173, each of which detects entry of an object into the working region R1 through the opened portion of the frame 171, are provided to the four horizontal members 171b of the frame 171. The three entry detection sensors 172 detect entry through three opened erected faces of the frame 171, respectively. The entry detection sensor 173 detects entry through an opened top face of the frame 171. These entry detection sensors 172 and 173 are, for example, infrared cameras. The entry detection sensor 137 and the entry detection sensors 172 and 173 are electrically connected to the control device 138, and the control shown in FIG. 8 is performed by the control device 138.

According to the configuration of the contact preventer 170, the working region R1 and the non-working region R2 are not closed, and thus, an object cannot be physically restricted from entering the working region R1 through any opened portion of the frame 171. However, by controlling the motors 11b, 12b, and 13b of the linear motion unit 3 and the motors 21c, 22c and 23c of the rotary unit 4 by the control device 138 on the basis of detection of the entry detection sensors 137, 172 and 173, work of carrying the workpiece 7 into/out of the working region R1 or assisting work for the work device body 1A can be assuredly performed.

Figure 10:
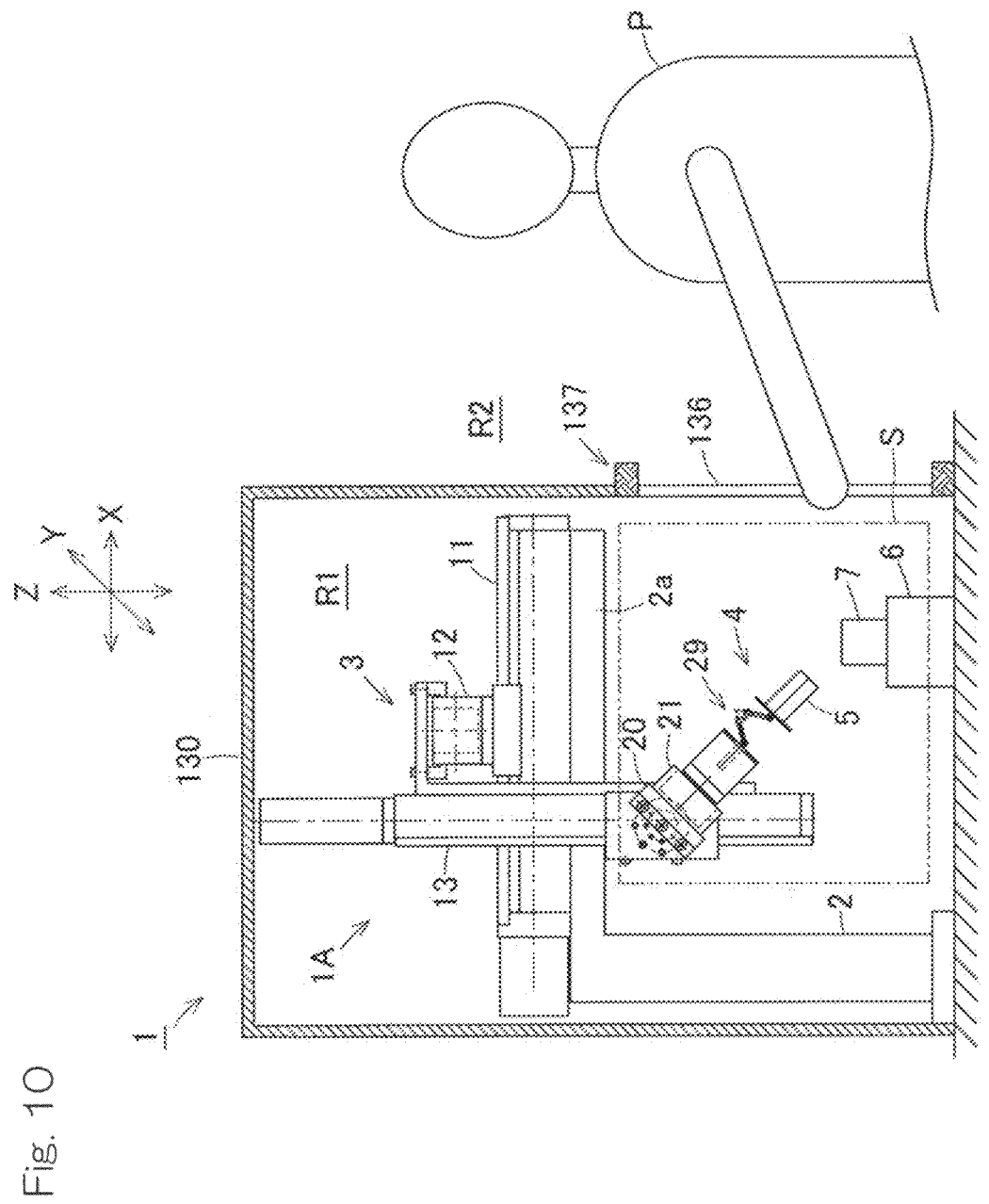
FIG. 10 is a front view representing a part of a work device according to a second embodiment of the present invention in a cross-section.

FIG. 10 to FIG. 16 show a second embodiment of the present invention. As shown in FIG. 10, in the work device body 1A of the work device 1, the rotary unit 4 includes: a first rotating mechanism 21 that is a rotating mechanism having one degree of freedom; and a second rotating mechanism composed of a link actuating device 29 having two degrees of freedom. Specifically, the second rotating mechanism 22 and the third rotating mechanism 23 in the first embodiment shown in FIG. 1 are replaced with the link actuating device 29. The other configuration is the same as in the first embodiment shown in FIG. 1.

Figure 11:
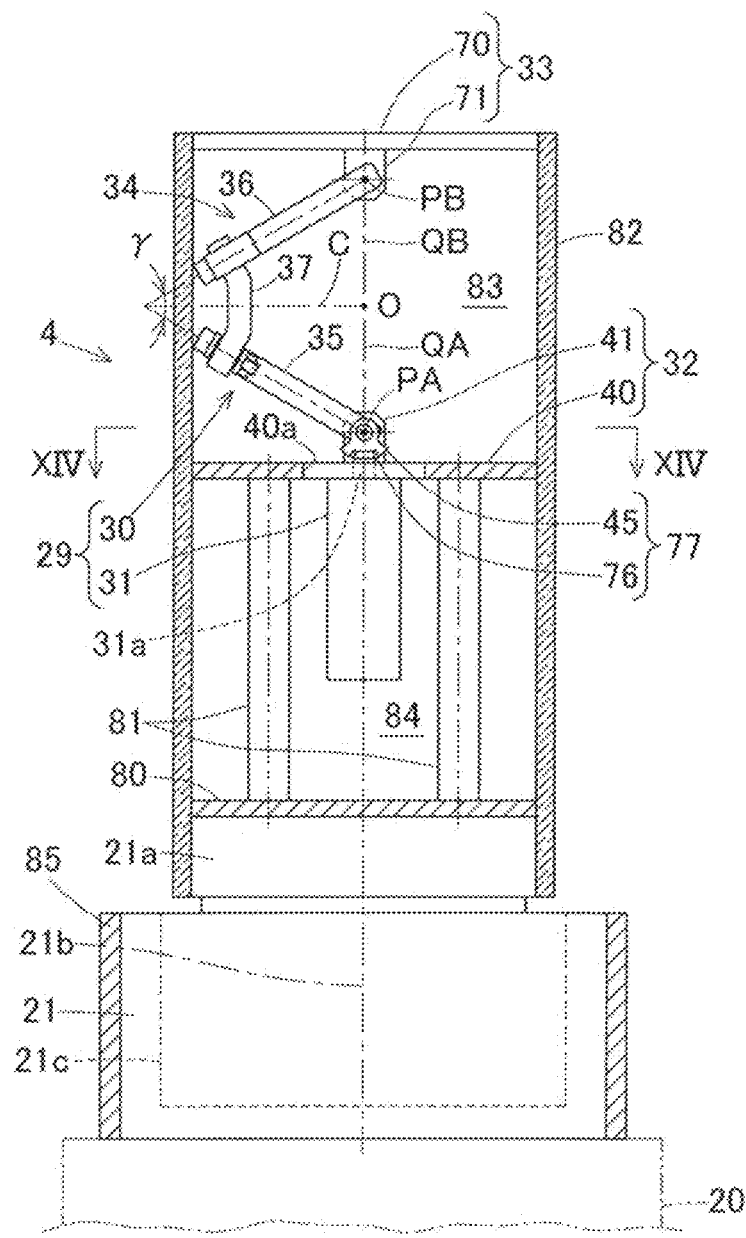
FIG. 11 is a front view representing a part of a rotary unit of a work device body of the work device in a cross-section.
Figure 12:
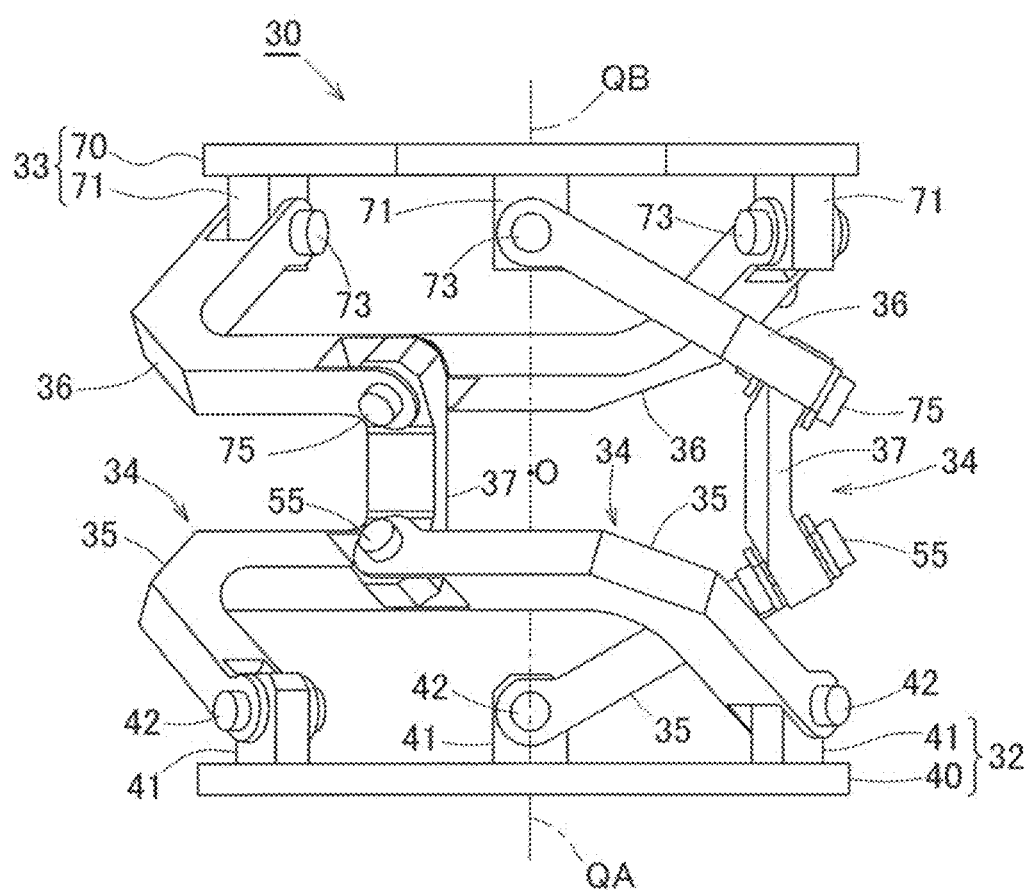
FIG. 12 is a perspective view of a parallel link mechanism of a link actuating device of the rotary unit.
Figure 13:
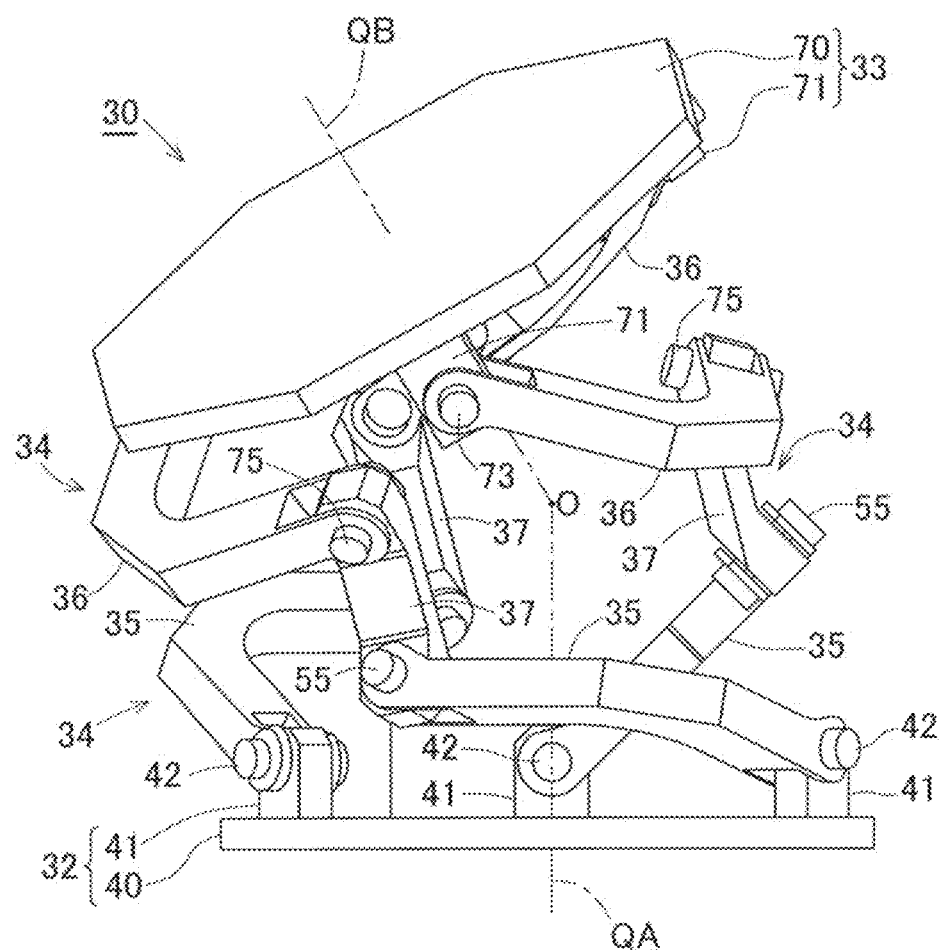
FIG. 13 is a perspective view of a different state of the parallel link mechanism.

As shown in FIG. 11, the link actuating device 29 has a parallel link mechanism 30 and posture control actuators 31 that operate the parallel link mechanism 30. FIG. 12 and FIG. 13 are perspective views of the parallel link mechanism 30. FIG. 12 and FIG. 13 show different states of the parallel link mechanism 30. As shown in FIG. 11 to FIG. 13, in the parallel link mechanism 30, a distal end side link hub 33 is coupled to a proximal end side link hub 32 via three link mechanisms 34 such that the posture of the distal end side link hub 33 can be changed relative to the proximal end side link hub 32. FIG. 11 shows only one link mechanism 34. The number of link mechanisms 34 may be four or more.

Each link mechanism 34 includes a proximal side end link member 35, a distal side end link member 36, and an intermediate link member 37. That is, each link mechanism 34 forms a quadric chain link mechanism composed of four revolute pairs. The proximal side and distal side end link members 35 and 36 each have an L-shape. The proximal side end link member 35 has one end rotatably coupled to the proximal end side link hub 32. The distal side end link member 36 has one end rotatably coupled to the distal end side link hub 33. The intermediate link member 37 has opposite ends rotatably coupled to the other ends of the proximal side and distal side end link members 35 and 36, respectively.

The parallel link mechanism 30 is formed by combining two spherical link mechanisms. Axes or center lines of the revolute pairs between the proximal end side link hub 32 and the proximal side end link members 35 and axes or center lines of the revolute pairs between the proximal side end link members 35 and the intermediate link members 37 intersect each other at a proximal end side spherical link center PA (FIG. 11). Similarly, axes or center lines of the revolute pairs between the distal end side link hub 33 and the distal side end link members 36 and axes or center lines of the revolute pairs between the distal side end link members 36 and the intermediate link members 37 intersect each other at a distal end side spherical link center PB (FIG. 11).

At the proximal end side, the distances from the revolute pairs between the proximal end side link hub 32 and the proximal side end link members 35 to the proximal end side spherical link center PA are equal to each other. In addition, the distances from the revolute pairs between the proximal side end link members 35 and the intermediate link members 37 to the proximal end side spherical link center PA are also equal to each other. Similarly, at the distal end side, the distances from the revolute pairs between the distal end side link hub 33 and the distal side end link members 36 to the distal end side spherical link center PB are equal to each other. In addition, the distances from the revolute pairs between the distal side end link members 36 and the intermediate link members 37 to the distal end side spherical link center PB are also equal to each other. The axes of the revolute pairs between the proximal side and distal side end link members 35 and 36 and the intermediate link member 37 may form a certain cross angle γ (FIG. 11), or may be parallel to each other.

Figure 14:
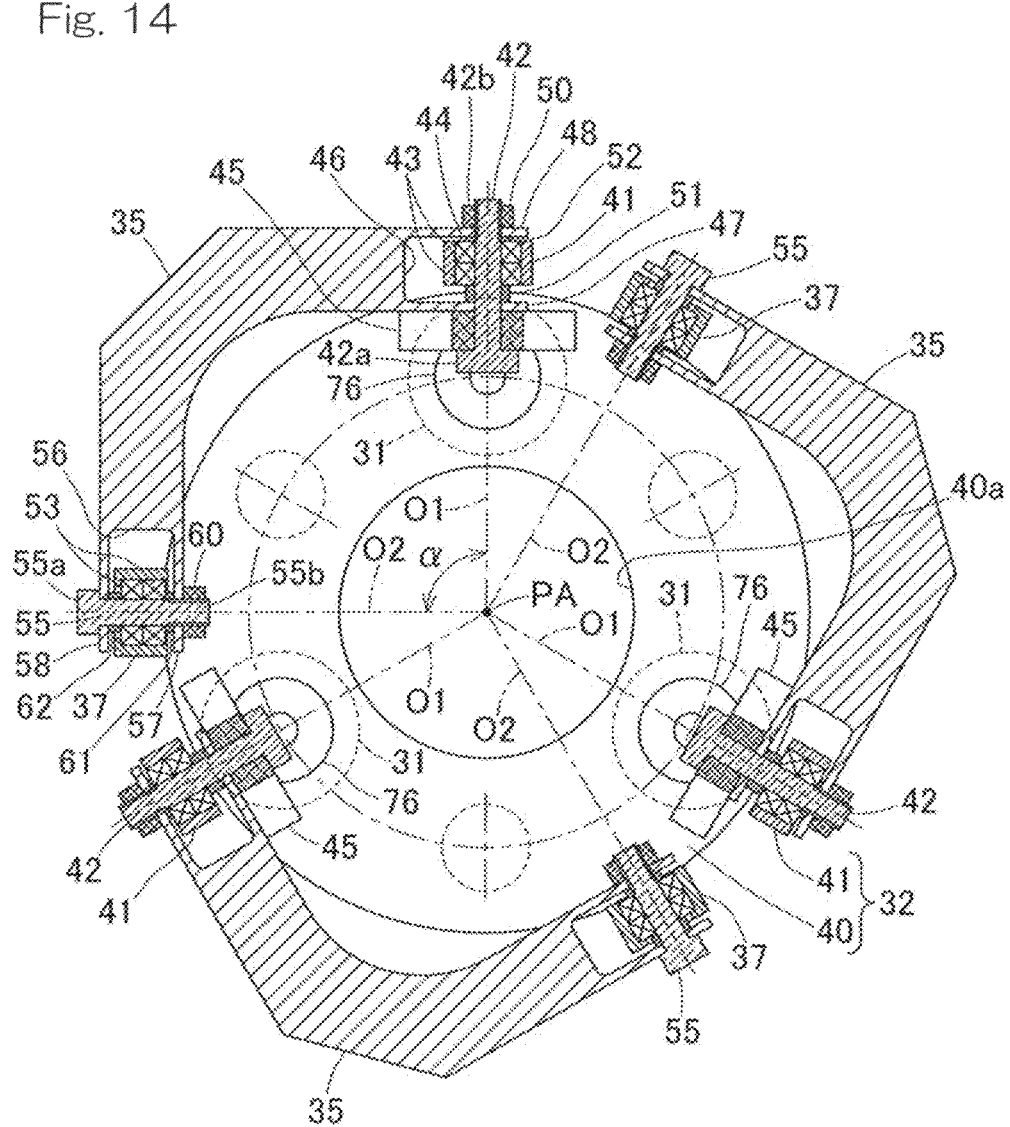
FIG. 14 is a cross-sectional view taken along a line XIV-XIV in FIG. 11.

FIG. 14 is a cross-sectional view taken along a line XIV-XIV in FIG. 11. FIG. 14 shows a relationship among: the axes O1 of the revolute pairs between the proximal end side link hub 32 and the proximal side end link members 35; the axes O2 of the revolute pairs between the intermediate link members 37 and the proximal side end link members 35; and the proximal end side spherical link center PA. Specifically, the point at which the axes O1 and the axes O2 intersect each other is the spherical link center PA. The shapes and the positional relationship of the distal end side link hub 33 and the distal side end link members 36 are the same as in FIG. 14. In FIG. 14, the angle α formed by the axis O1 of the revolute pair between the link hub 32 (33) and the end link member 35 (36) and the axis O2 of the revolute pair between the end link member 35 (36) and the intermediate link member 37 is 90°. However, the angle α may be an angle other than 90°.

Figure 15:
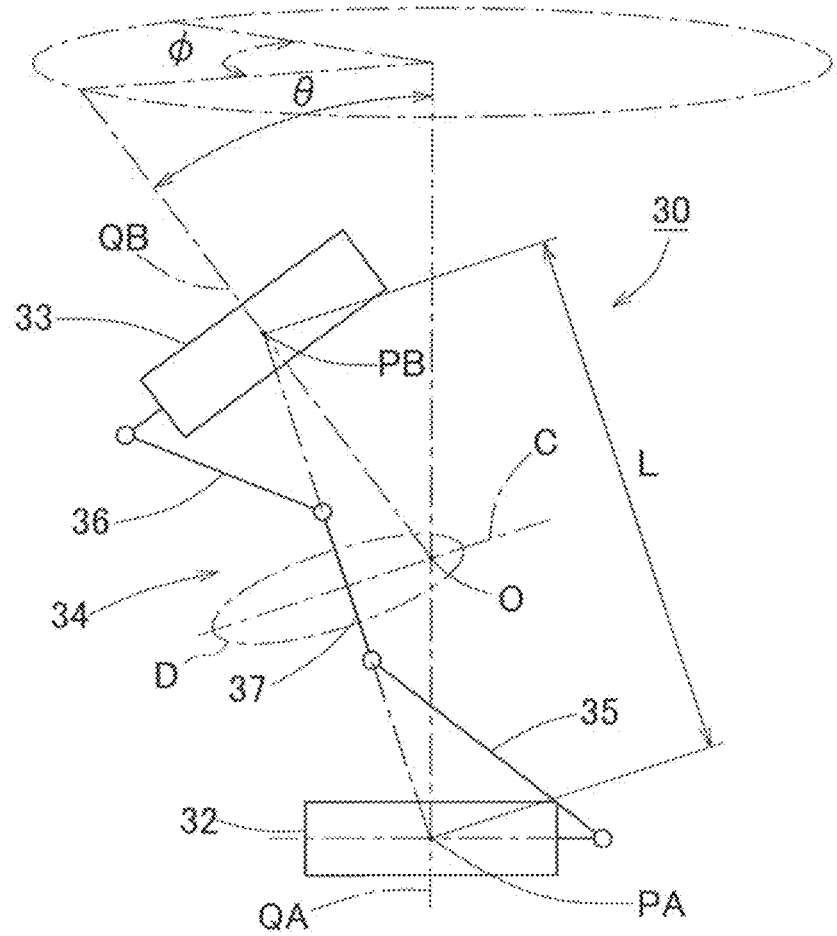
FIG. 15 is a diagram representing one link mechanism of the link actuating device with straight lines.

The three link mechanisms 34 have a geometrically identical configuration. The wording "geometrically identical configuration" means that, as shown in FIG. 15, a geometric model depicted with straight lines representing the link members 35, 36 and 37, that is, a model depicted with the revolute pairs and straight lines connecting these revolute pairs, represents a shape in which a proximal end side portion and a distal end side portion are symmetrical with each other with respect to the center portion of the intermediate link member 37. FIG. 15 is a diagram representing one link mechanism 34 with straight lines. The parallel link mechanism 30 of this embodiment is of a rotation symmetrical type. That is, the positional relationship between a proximal side portion composed of the proximal end side link hub 32 and the proximal side end link member 35, and a distal side portion composed of the distal end side link hub 33 and the distal side end link member 36 is in rotation symmetry relative to a center line C of the intermediate link member 37. The center portion of each intermediate link member 37 is located on a common orbital circle D.

The proximal end side link hub 32, the distal end side link hub 33, and the three link mechanisms 34 cooperate together to form a two-degrees-of-freedom mechanism in which the distal end side link hub 33 is rotatable about two mutually orthogonal axes relative to the proximal end side link hub 32. In other words, the two-degrees-of-freedom mechanism allows the distal end side link hub 33 to rotate with two degrees of freedom to change its posture relative to the proximal end side link hub 32. This two-degrees-of-freedom mechanism is compact in size, but can achieve a wide range of movement for the distal end side link hub 33 relative to the proximal end side link hub 32.

For example, a straight line that passes through the proximal end side spherical link center PA and intersects the axis O1 (FIG. 14) of the revolute pair between the proximal end side link hub 32 and each proximal side end link member 35 at a right angle is defined as an axis or center line QA of the proximal end side link hub 32. Similarly, a straight line that passes through the distal end side spherical link center PB and intersects the axis O1 (FIG. 14) of the revolute pair between the distal end side link hub 33 and each distal side end link member 36 at a right angle is defined as an axis or center line QB of the distal end side link hub 33. In this case, the maximum value of the bending angle θ (FIG. 15) between the axis QA of the proximal end side link hub 32 and the axis QB of the distal end side link hub 33 can be set about ±90°. In addition, the turning angle φ (FIG. 15) of the distal end side link hub 33 relative to the proximal end side link hub 32 can be set in the range of 0° to 360°.

The bending angle θ means a vertical angle formed when the axis QB of the distal end side link hub 33 is inclined relative to the axis QA of the proximal end side link hub 32. The turning angle φ means a horizontal angle formed when the axis QB of the distal end side link hub 33 is inclined relative to the axis QA of the proximal end side link hub 32.

The posture of the distal end side link hub 33 relative to the proximal end side link hub 32 is changed with the point of intersection O between the axis QA of the proximal end side link hub 32 and the axis QB of the distal end side link hub 33 as a rotation center. FIG. 12 shows a state where the axis QA of the proximal end side link hub 32 and the axis QB of the distal end side link hub 33 are on the same line. FIG. 13 shows a state where the axis QB of the distal end side link hub 33 forms a certain operating angle relative to the axis QA of the proximal end side link hub 32. Even when the posture is changed, the distance L (FIG. 15) between the proximal and distal end side spherical link centers PA and PB does not change.

When each link mechanism 34 satisfies the following conditions 1 to 5, the proximal side portion composed of the proximal end side link hub 32 and the proximal side end link member 35, and the distal side portion composed of the distal end side link hub 33 and the distal side end link member 36 move in the same manner due to the geometrical symmetry. Thus, when rotation is transmitted from the proximal end side to the distal end side, the parallel link mechanism 30 serves as a constant velocity universal joint in which the proximal end side and the distal end side are rotated by the same angle at an equal speed.

Condition 1: The angles and the lengths of the axes O1 of the revolute pairs between the link hubs 32 and 33 and the end link members 35 and 36 in each link mechanism 34 are equal to each other at the proximal end side and the distal end side.

Condition 2: The axes O1 of the revolute pairs between the link hubs 32 and 33 and the end link members 35 and 36 and the axes O2 of the revolute pairs between the end link members 35 and 36 and the intermediate link member 37 intersect each other at the spherical link centers PA and PB at the proximal end side and the distal end side.

Condition 3: The geometrical shapes of the proximal side end link member 35 and the distal side end link member 36 are the same.

Condition 4: The geometrical shapes of the proximal end side portion and the distal end side portion of the intermediate link member 37 are the same.

Condition 5: The angular positional relationships between the intermediate link member 37 and the end link members 35 and 36 with respect to the symmetry plane of the intermediate link member 37 are identical between the proximal end side and the distal end side.

As shown in FIG. 11 to FIG. 13, the proximal end side link hub 32 has a proximal end member 40 and three rotation shaft coupling members 41 provided so as to be integrated with the proximal end member 40. As shown in FIG. 14, the proximal end member 40 has a circular through hole 40a defined in a center portion thereof. The three rotation shaft coupling members 41 are disposed equidistantly in the circumferential direction around the through hole 40a. The center of the through hole 40a is located on the axis QA (FIG. 11) of the proximal end side link hub 32. A rotation shaft 42 is rotatably coupled to each rotation shaft coupling member 41. The axis of the rotation shaft 42 intersects the axis QA of the proximal end side link hub 32. The rotation shaft 42 has a head portion 42a and a threaded portion 42b. An end of the proximal side end link member 35 is coupled to the rotation shaft 42.

As shown in FIG. 14, the rotation shaft 42 is rotatably supported by the rotation shaft coupling member 41 via two bearings 43. Each bearing 43 is a ball bearing such as, for example, a deep groove ball bearing and an angular contact ball bearing. These bearings 43 are mounted in a radially inner hole 44 provided in the rotation shaft coupling member 41, in a state of being fitted therein, and are fixed by a method such as, for example, press-fitting, adhesion and crimping. The same also applies to the type of and a mounting method for bearings provided to the other revolute pair sections.

One end of the proximal side end link member 35 and a sector-shaped bevel gear 45 described later are connected to the rotation shaft 42. The proximal side end link member 35 and the bevel gear 45 rotate integrally with the rotation shaft 42. Specifically, a cut portion 46 is formed at the one end of the proximal side end link member 35. Rotation shaft support portions 47 and 48 are formed at radially inner side and outer side of the cut portion 46. The rotation shaft coupling member 41 is disposed between the rotation shaft support portions 47 and 48.

The bevel gear 45 is disposed in contact with the inner surface of the rotation shaft support portion 47 at the inner side. The rotation shaft 42 is inserted into a through hole formed in the bevel gear 45, a through hole formed in the inner rotation shaft support portion 47, inner rings of the bearings 43, and a through hole formed in the outer rotation shaft support portion 48, in this order, from the radially inner side. Furthermore, a nut 50 is screwed onto the threaded portion 42b of the rotation shaft 42. Accordingly, the inner and outer rotation shaft support portions 47 and 48 and the inner rings of the bearings 43 are held between the head portion 42a of the rotation shaft 42 and the nut 50, so as to be connected to each other. In the present embodiment, spacers 51 and 52 are interposed between the inner and outer rotation shaft support portions 47 and 48 and the bearings 43. Accordingly, a preload is applied to the bearings 43 at the time of screwing the nut 50.

A rotation shaft 55 is connected to the other end of the proximal side end link member 35. The rotation shaft 55 has a head portion 55a and a threaded portion 55b. The rotation shaft 55 is rotatably coupled to one end of the intermediate link member 37 via two bearings 53. Specifically, a cut portion 56 is formed at the other end of the proximal side end link member 35. Inner and outer rotation shaft support portions 57 and 58 are formed at the radially inner side and outer side of the cut portion 56. The one end of the intermediate link member 37 is disposed between the rotation shaft support portions 57 and 58.

The rotation shaft 55 is inserted into a through hole formed in the outer rotation shaft support portion 58, inner rings of the bearings 53 and a through hole formed in the inner rotation shaft support portion 57, in this order, from the radially outer side. Furthermore, a nut 60 is screwed onto the threaded portion 55b of the rotation shaft 55. Accordingly, the inner and outer rotation shaft support portions 57 and 58 and the inner rings of the bearings 53 are held between the head portion 55a of the rotation shaft 55 and the nut 60, so as to be connected to each other. In the present embodiment, spacers 61 and 62 are interposed between the inner and outer rotation shaft support portions 57 and 58 and the bearings 53. Accordingly, a preload is applied to the bearings 53 at the time of screwing the nut 60.

As shown in FIG. 12 and FIG. 13, the distal end side link hub 33 has a distal end member 70 and three rotation shaft coupling members 71 provided on the inner surface of the distal end member 70. The three rotation shaft coupling members 71 are provided equidistantly in the circumferential direction on the inner surface of the distal end member 70. The center of the circle having the circumference, on which the rotation shaft coupling members 71 are disposed, is located on the axis QB of the distal end side link hub 33. A rotation shaft 73 is rotatably coupled to each rotation shaft coupling member 71. The axis of the rotation shaft 73 intersects the link hub axis QB.

One end of the distal side end link member 36 is coupled to the rotation shaft 73 at the distal end side link hub 33. A rotation shaft 75 is coupled to the other end of the distal side end link member 36. The rotation shaft 75 is rotatably coupled to the other end of the intermediate link member 37. Similar to the above-described rotation shaft 42, the rotation shaft 73 at the distal end side link hub 33 is rotatably coupled to the other end of the rotation shaft coupling member 71 via two bearings (not shown). Meanwhile, similar to the above-described rotation shaft 55, the rotation shaft 75 at the intermediate link member 37 is rotatably coupled to the other end of the intermediate link member 37 via two bearings (not shown).

In the parallel link mechanism 30 shown in FIG. 11, the proximal end member 40 and a base member 80 are coupled to each other via a plurality of shafts 81. Accordingly, the parallel link mechanism 30 is mounted on the first rotating mechanism 21. The axis QA of the proximal end side link hub 32 and the rotation axis 21*b* of the first rotating mechanism 21 are located on the same line. The base member 80 is fixed to the rotating portion 21*a* of the first rotating mechanism 21.

A tubular protective cover 82 is provided around the link actuating device 29 so as to surround the link actuating device 29. The protective cover 82 is made from an elastic material such as rubber. The protective cover 82 is attached to the outer circumferential edge of the base member 80, the outer circumferential edge of the proximal end member 40, and the outer circumferential edge of the distal end member 70. The protective cover 82 can be deformed according to change of the posture of the distal end side link hub 33 relative to the proximal end side link hub 32. The protective cover 82 forms an entry prevention cover that prevents an object from entering an internal space 83 between the proximal end side link hub 32 and the distal end side link hub 33 and a shielded space 84 between the proximal end side link hub 32 and the base member 80.

A protective cover 85 is provided on the outer circumferential surface of a fixed portion of the first rotating mechanism 21 in a state of being stuck thereon. The protective cover 85 is made from a material having a shock absorption property such as rubber. The protective cover 85 serves as a cushioning material that alleviates shock when an object comes into contact therewith.

The parallel link mechanism 30 is operated by the posture control actuators 31. The posture control actuators 31 are disposed in the shielded space 84 and are mounted on the proximal end member 40. The number of the posture control actuators 31 is three, which is equal to the number of the link mechanisms 34. Each posture control actuator 31 is composed of, for example, a rotary actuator such as a motor. A gear 76 is mounted on a rotation output shaft 31*a* of the posture control actuator 31. In addition, the above-described sector-shaped bevel gear 45 is mounted on the rotation shaft 42 at the proximal end side link hub 32. These bevel gears 76 and 45 are in mesh with each other. In the present embodiment, the bevel gear 76 and the sector-shaped bevel gear 45 cooperate together to form an axis-orthogonal type speed reducer 77. However, an axis-orthogonal type speed reducer may be formed by using another mechanism other than the bevel gears (for example, a worm mechanism).

In this embodiment, the posture control actuators 31, the number of which is equal to that of the link mechanisms 34, are provided. However, the posture control actuator 31 only needs to be provided to at least two of the three link mechanisms 34. Accordingly, the posture of the distal end side link hub 33 relative to the proximal end side link hub 32 can be determined.

The link actuating device 29 operates the parallel link mechanism 30 by rotationally driving each posture control actuator 31. Specifically, when each posture control actuator 31 is rotationally driven, the rotation thereof is transmitted to the rotation shaft 42 via the axis-orthogonal type speed reducer 77. Accordingly, the angle of the proximal side end link member 35 relative to the proximal end side link hub 32 is changed. As a result, the position and the posture of the distal end side link hub 33 relative to the proximal end side link hub 32 are determined. Since the axis QA of the proximal end side link hub 32 and the rotation axis 21*b* of the first rotating mechanism 21 are located on the same line, coordinate calculation is easy.

When the axis QA of the proximal end side link hub 32 and the rotation axis 21*b* of the first rotating mechanism 21 are located on the same line, the operator easily imagines operation of the work device body 1A. Thus, manipulation is easy. For example, the positions of three degrees of freedom determined by the linear motion unit 3 are fixed, and the angles of two degrees of freedom of the angles of the three degrees of freedom determined by the rotary unit 4 are fixed, and only the angle of the remaining one degree of freedom (for example, an angle about the axis QB of the distal end side link hub 33) is changed. Work can be easily performed while the posture of the end effector 5 is being changed in this manner.

As described above, the link actuating device 29 can smoothly operate in a wide range of movement. Therefore, when the rotary unit 4 includes the link actuating device 29, fine work can be performed at a high speed. In addition, the link actuating device 29 has a compact configuration but has a wide range of movement. Thus, the entire configuration of the work device body 1A is compact.

In this embodiment, the first rotating mechanism 21 is disposed at the proximal end side of the link actuating device 29, and the end effector 5 is mounted on the distal end side link hub 33. Accordingly, a load on the link actuating device 29 can be reduced, and therefore, the link actuating device 29 can be made compact and reduced in weight. The parallel link mechanism 30 of the link actuating device 29 is configured as a constant velocity universal joint. Therefore, as described above, work can be easily performed while the posture of the end effector 5 is being changed by changing only the angle of one degree of freedom. However, it is necessary to take into consideration cables connected to each posture control actuator 31, and thus, the rotation angle is limited.

Figure 16:
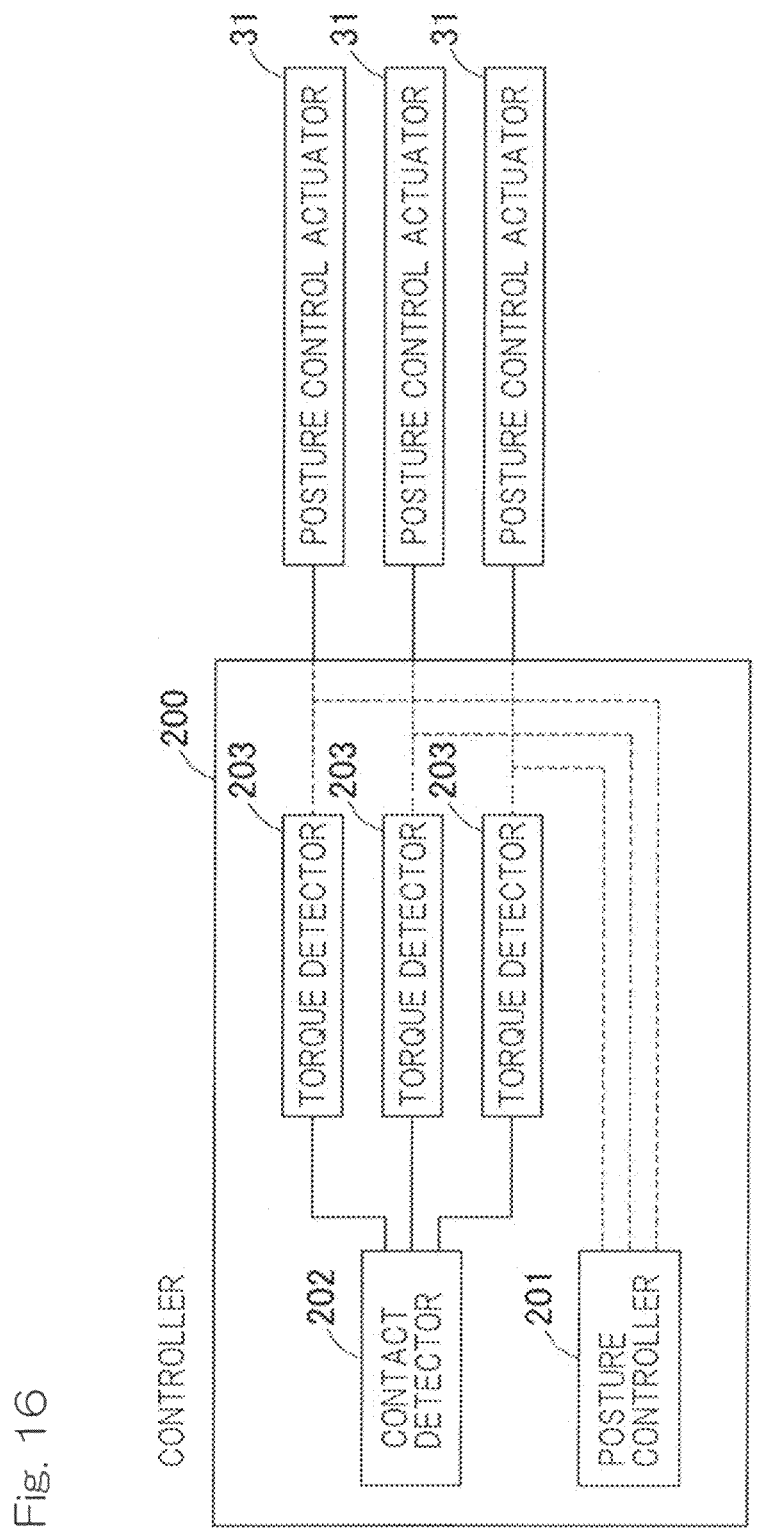
FIG. 16 is a block diagram showing the configuration of a controller of the work device.

FIG. 16 shows the configuration of a controller 200 that controls each posture control actuator 31. The controller 200 has a posture controller 201 and a contact detector 202.

The posture controller 201 outputs a command to each posture control actuator 31 in accordance with a posture change command provided from a high-order control means (not shown) or a manual input operation means (not shown).

The contact detector 202 detects contact of an object with the rotary unit 4 on the basis of a detection signal from a torque detector 203 provided to each posture control actuator 31. Specifically, the contact detector 202 estimates a load applied to the distal end side link hub 33, on the basis of a detection signal from the torque detector 203. The contact detector 202 determines whether an object has come into contact with the rotary unit 4, on the basis of the magnitude of the load. Regarding the estimation of the load applied to the distal end side link hub 33, the load does not necessarily have to be estimated as a value, and, for example, stepwise estimation may be performed such that it can be determined whether contact has occurred. The torque detector 203 is, for example, a current sensor that detects current flowing through the posture control actuator 31.

The link actuating device 29 is configured to be smoothly movable in all directions within the range of movement thereof without any singular point. Thus, even when foreign matter comes into contact with the distal end side link hub 33 from various directions, torque is assuredly transmitted to each posture control actuator 31. Accordingly, the torque detector 203 can detect torque in various directions. Therefore, the contact detector 202 can accurately detect contact of an object.

When the contact detector 202 has detected contact, output to the posture control actuator 31 is stopped by each posture controller 201. Accordingly, the rotary unit 4 is protected. By using the torque detector 203 of each posture control actuator 31 for detecting contact as described above, the necessity to provide another sensor for contact detection can be eliminated. As a result, the device is made compact and reduced in cost.

The protective cover 82 is provided, as an entry prevention cover, around the link actuating device 29. Thus, an object can be prevented from entering the internal space 83 between the proximal end side link hub 32 and the distal end side link hub 33. In addition, the protective cover 85 is provided, as a cushioning material, on the outer circumferential surface of the first rotating mechanism 21. Therefore, even if an object comes into contact with the first rotating mechanism 21, the shock is alleviated.

An object may enter the working region R1 within the cover 130 only through the entry allowing portion 136. Therefore, a portion of the work device body 1A, that may come into contact with an object, is substantially limited to the rotary unit 4. Thus, when the cushioning material is provided only to the rotary unit 4, the device can be protected. Accordingly, installation of a facility for contact prevention can be minimized, and therefore, the entire device is rendered to be inexpensive.

Figure 17:
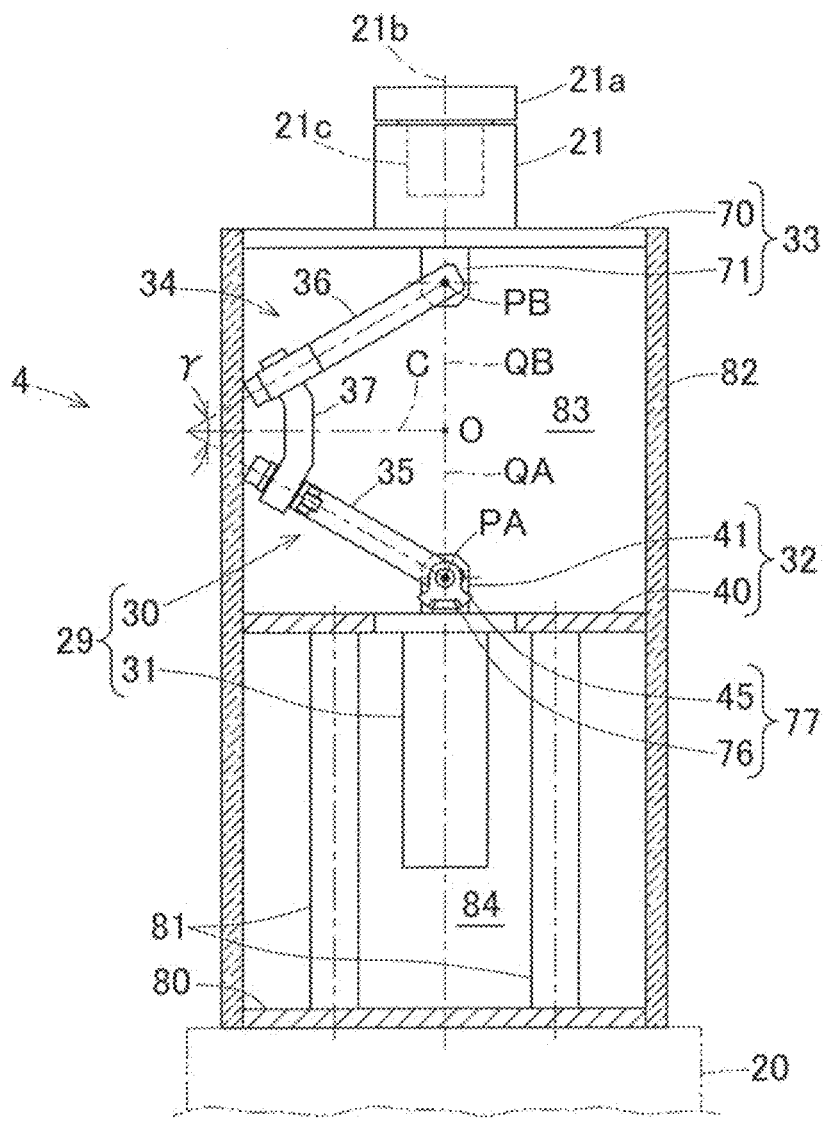
FIG. 17 is a front view representing a part of a rotary unit of a work device body of a work device according to a third embodiment of the present invention in a cross-section.

FIG. 17 shows a rotary unit 4 of a work device body of a work device according to a third embodiment. In the third embodiment, alignment of the first rotating mechanism 21 and the link actuating device 29 is inverted from that in the configuration shown in FIG. 11. In the rotary unit 4, the axis QB of the distal end side link hub 33 of the link actuating device 29 and the rotation axis 21b of the first rotating mechanism 21 are located on the same line. In the third embodiment, a protective cover 82 is provided, as an entry prevention cover, around the link actuating device 29. In the third embodiment, a protective cover is not provided, as a cushioning material, on the outer circumferential surface of the first rotating mechanism 21. However, a protective cover may be provided, as a cushioning material, on the outer circumferential surface of the first rotating mechanism 21. The other structure is the same as in the second embodiment shown in FIG. 11.

With the configuration of the rotary unit 4 of the third embodiment, it is easy to arrange cables connected to the posture control actuators 31, and the rotation angle is less likely to be limited. On the other hand, there is a drawback that a load on the link actuating device 29 increases. Other than this, the same operation and advantageous effects as in the second embodiment shown in FIG. 11 are achieved.

Figure 18:
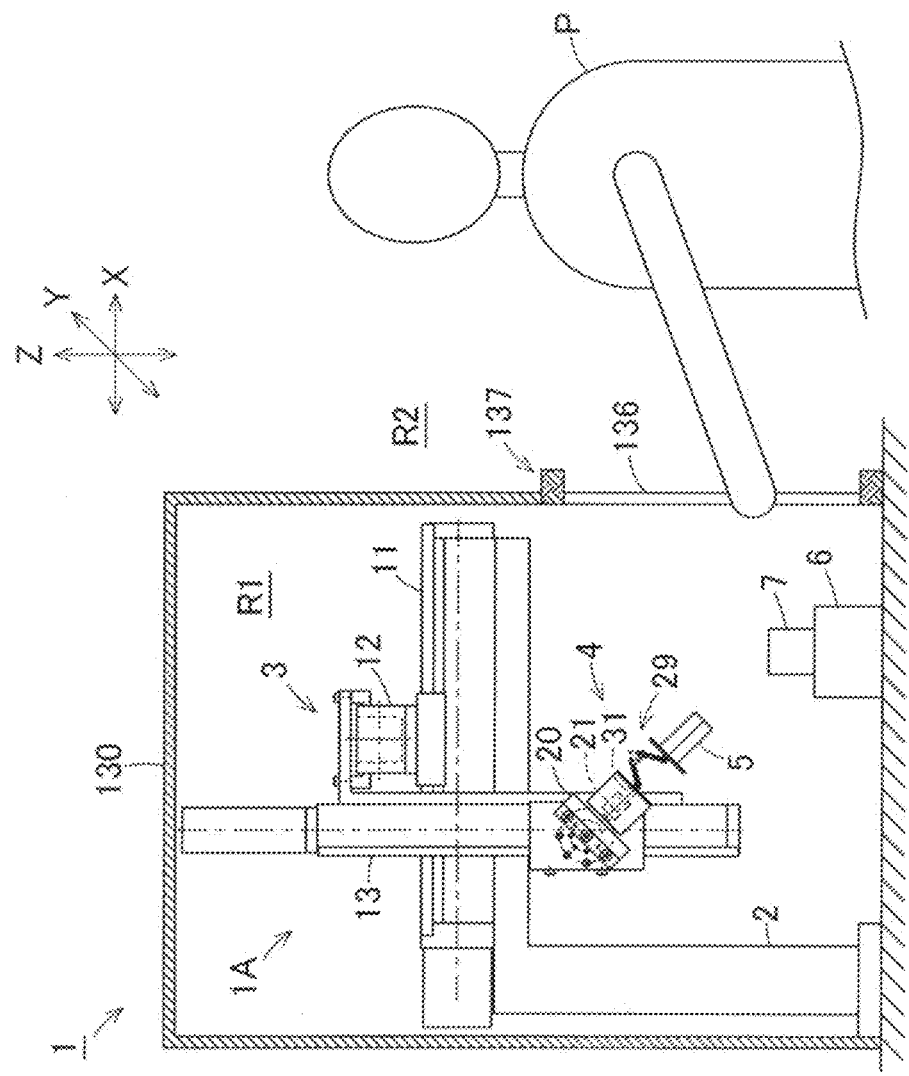
FIG. 18 is a front view representing a part of a work device according to a fourth embodiment of the present invention in a cross-section.
Figure 19:
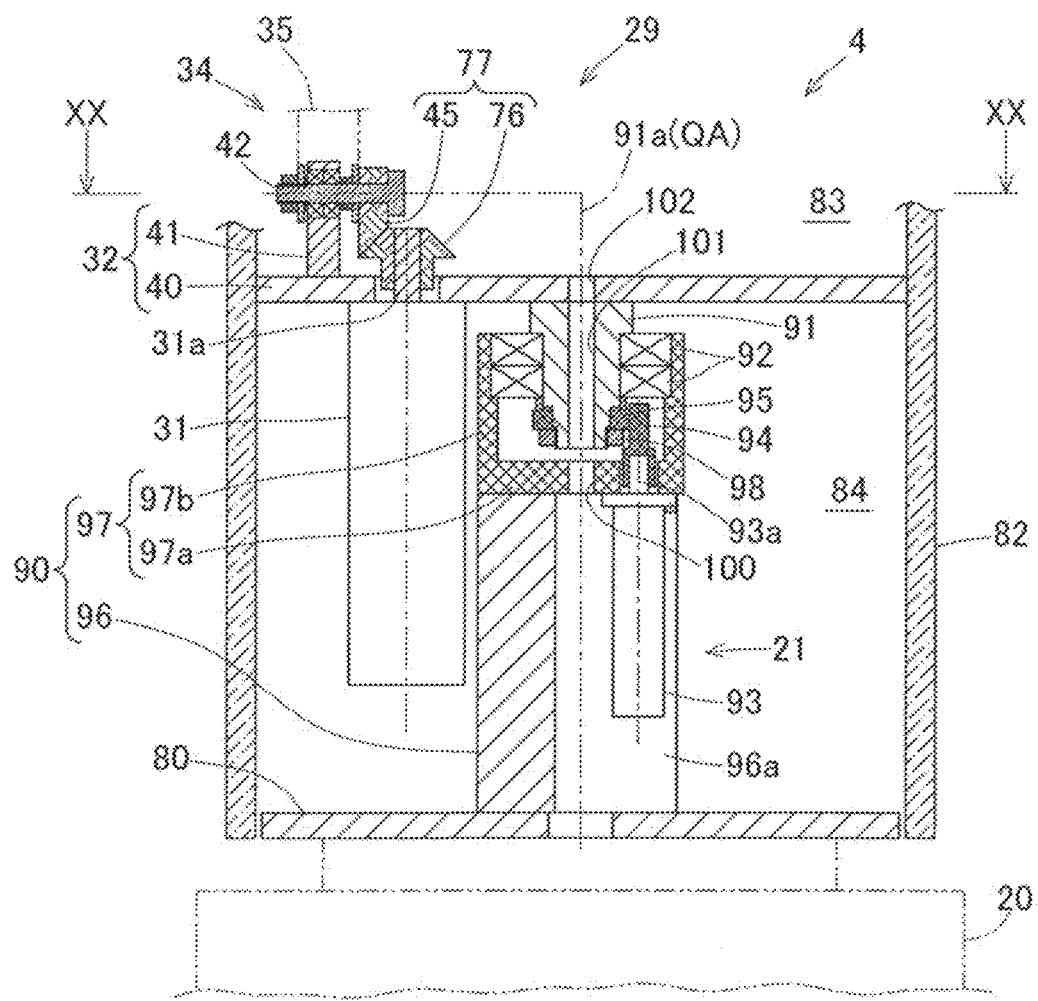
FIG. 19 is a front view showing a main part of a rotary unit of a work device body of the work device.
Figure 20:
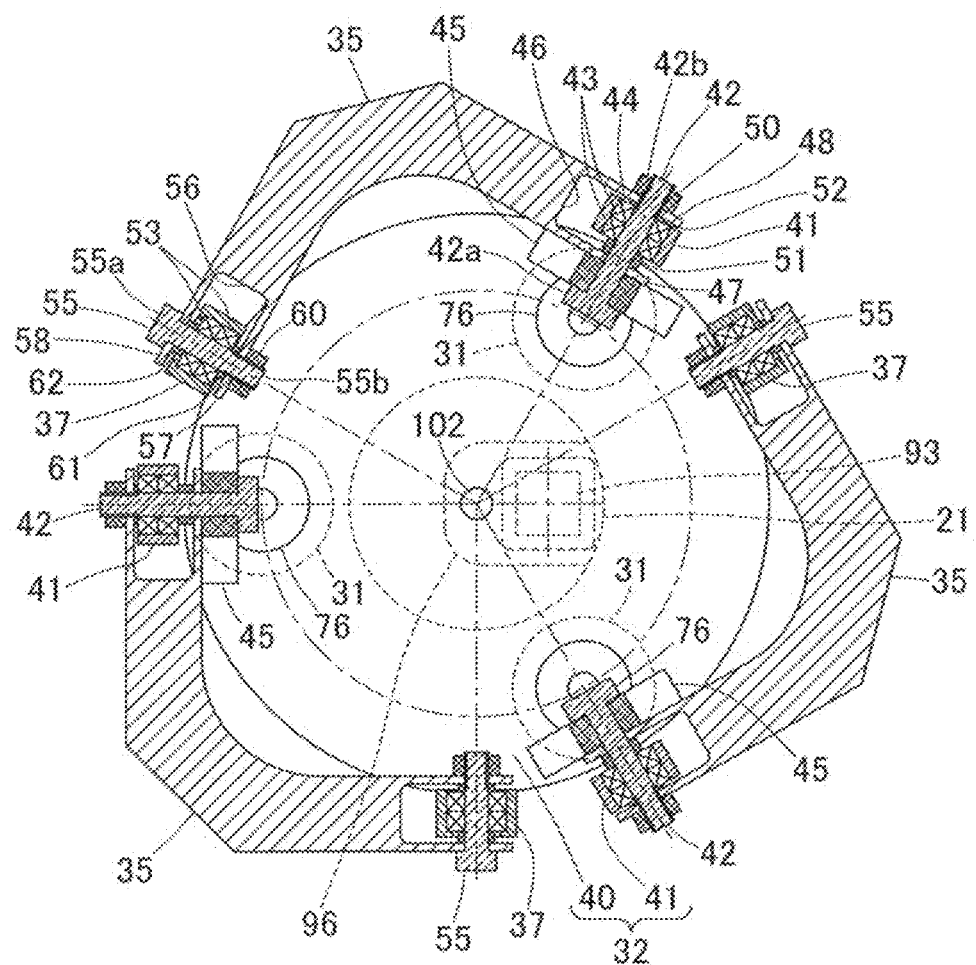
FIG. 20 is a cross-sectional view taken along a line XX-XX in FIG. 19.

FIG. 18 to FIG. 20 show a fourth embodiment of the present invention. In the work device 1 shown in FIG. 18, similar to the second embodiment shown in FIG. 10, the rotary unit 4 of the work device body 1A includes a first rotating mechanism 21 that is a rotating mechanism having one degree of freedom, and a link actuating device 29 that is a rotating mechanism having two degrees of freedom. The work device 1 of the fourth embodiment is different from that of the second embodiment shown in FIG. 10, in that the first rotating mechanism 21 is disposed at a center portion of the posture control actuators 31 of the link actuating device 29.

As shown in FIG. 19, the first rotating mechanism 21 includes: a fixed portion 90 that is fixed to the base member 80; a rotating portion 91 that is fixed to the proximal end member 40 of the link actuating device 29; two bearings 92 via which the rotating portion 91 is rotatably supported by the fixed portion 90; a motor 93 that is a drive source mounted on the fixed portion 90; and a pair of spur gears 94 and 95 that transmit rotation of the motor 93 to the rotating portion 91.

The base member 80 is fixed to the rotary unit mounting member 20. The fixed portion 90 has a first mounting member 96 fixed to the base member 80, and a second mounting member 97 fixed to the first mounting member 96. The second mounting member 97 has a bottom portion 97a fixed to the first mounting member 96 and a tubular portion 97b extending upward from the outer circumferential edge of the bottom portion 97a. The rotating portion 91 is fixed to the proximal end member 40 of the proximal end side link hub 32 such that the rotation axis 91a of the rotating portion 91 is located so as to be coaxial with the axis QA of the proximal end side link hub 32. A threaded portion is provided at the lower end of the rotating portion 91, and a nut 98 is screwed on the threaded portion. The two bearings 92 are disposed on the inner periphery of the tubular portion 97b of the second mounting member 97.

The first mounting member 96 has a horizontal cross-sectional shape that is a substantially U shape. The motor 93 is disposed in a recess 96a of the U-shaped first mounting member 96. The motor 93 is fixed to the bottom portion 97a of the second mounting member 97. An output shaft 93a of the motor 93 penetrates the bottom portion 97a of the second mounting member 97 and extends upward. The spur gear 94 at the drive side is mounted on the upper end of the output shaft 93a of the motor 93. The spur gear 94 at the drive side is in mesh with the spur gear 95 at the driven side. The spur gear 95 at the driven side is mounted on the rotating portion 91. The spur gear 95 at the driven side is fitted on the outer periphery of the rotating portion 91. The spur gear 95 at the driven side is fixed to the rotating portion 91 by the nut 98.

Wiring holes 100, 101 and 102 are provided in the bottom portion 97a of the second mounting member 97, the rotating portion 91, and the proximal end member 40, respectively. The respective wiring holes 100, 101 and 102 penetrate along the rotation axis 91a of the rotating portion 91. A tubular protective cover 82, made from an elastic material, is attached to the outer circumferential edge of the proximal end member 40 and the outer circumferential edge of a distal end member (not shown). The protective cover 82 forms an entry prevention cover that prevents an object from entering an internal space 83 between the proximal end side link hub 32 and a distal end side link hub (not shown) and a shielded space 84 between the proximal end side link hub 32 and the base member 80. The protective cover 82 extends to the vicinity of the outer circumferential edge of the base member 80 but is not connected to the base member 80.

Similar to the second embodiment shown in FIG. 11, the three posture control actuators 31 of the link actuating device 29 are disposed on the circumference of a virtual circle on the proximal end member 40. Rotational driving force of the rotation output shaft 31a of each posture control actuator 31 is transmitted via the axis-orthogonal type speed reducer 77 to the link mechanism 34. When the posture control actuators 31 are disposed as described above, the first rotating mechanism 21 can be arranged at the center of alignment of the posture control actuators 31 as in the fourth embodiment shown in FIG. 20. Accordingly, the configuration of the rotary unit 4 is rendered to be compact.

When the motor 93 is driven, the entire link actuating device 29 and the protective cover 82 rotate integrally with the rotating portion 91. By passing a cable through the wiring holes 100, 101 and 102, the end effector 5 can be wired from the internal space 83 of the link actuating device 29 without interference with the link mechanism 34. Thus, limitations on installation of the cables connected to the posture control actuators 31 are reduced.

Figure 21:
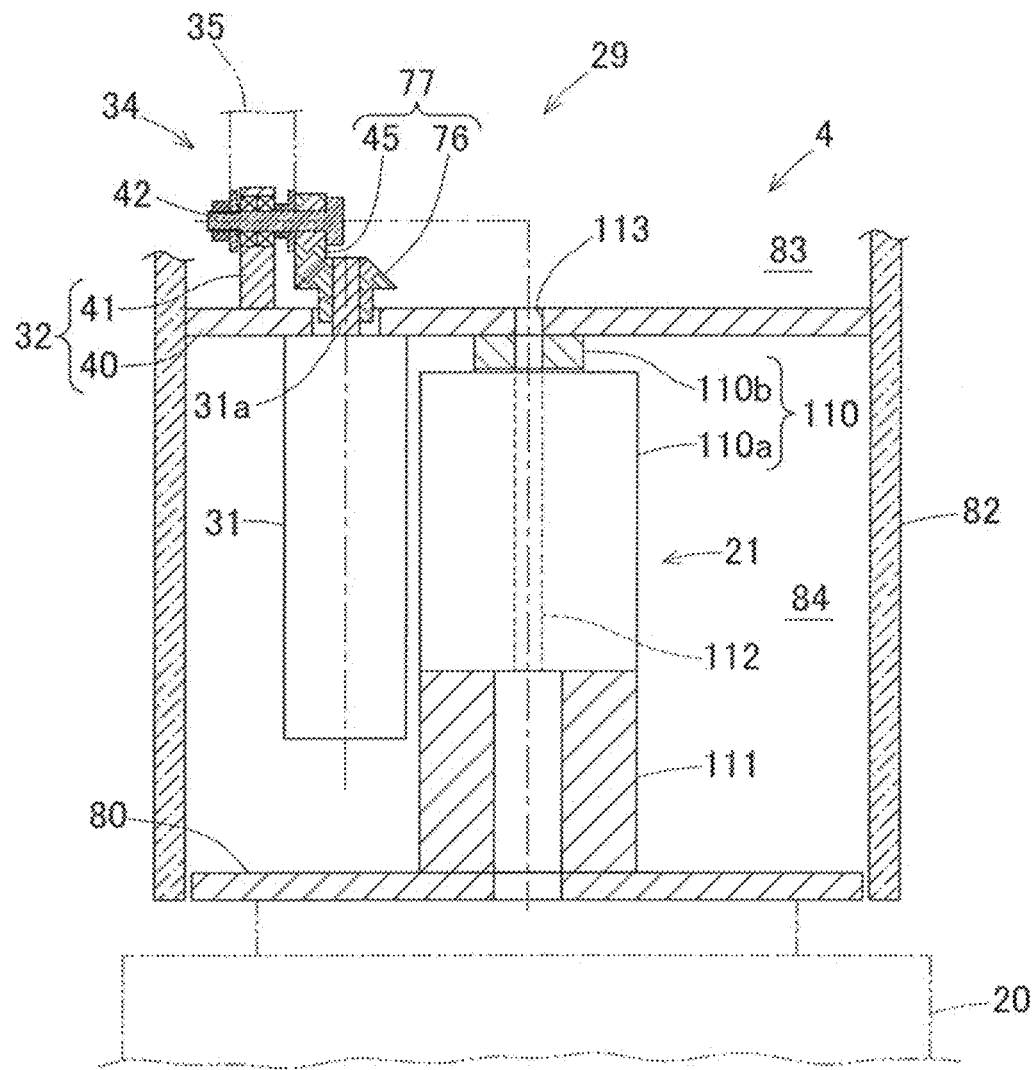
FIG. 21 is a front view showing a main part of a rotary unit of a work device body of a work device according to a fifth embodiment of the present invention.

FIG. 21 is a front view of a main part of a rotary unit of a work device according to a fifth embodiment of the present invention. In the rotary unit 4, the first rotating mechanism 21 is arranged at a center portion of the posture control actuators 31 of the link actuating device 29. This arrangement is the same as in the fourth embodiment shown in FIG. 19, but the drive source of the first rotating mechanism 21 is a hollow shaft motor 110 unlike the fourth embodiment shown in FIG. 19.

A motor body 110a of the hollow shaft motor 110 is fixed to the base member 80 via a motor mounting member 111. The proximal end member 40 of the proximal end side link hub 32 is fixed to an output shaft 110b of the hollow shaft motor 110. The hollow shaft motor 110 has a wiring hole 112 that penetrates the motor body 110a and the output shaft 110b in the axial direction. In addition, a wiring hole 113 is also provided in the proximal end member 40 of the proximal end side link hub 32 so as to be coaxial with the wiring hole 112. The other configuration is the same as in the fourth embodiment shown in FIG. 19, and the same operation and advantageous effects as in the fourth embodiment shown in FIG. 19 are achieved.

FIG. 22 to FIG. 25 show a dual-arm work device according to a sixth embodiment of the present invention. As shown in an entire front view of FIG. 22, the dual-arm work device 120 includes two work device bodies 1A, 1A and a cover 150 that surrounds these two work device bodies 1A, 1A. The cover 150 forms a contact preventer that prevents an object from needlessly coming into contact with any of the work device bodies 1A, 1A.

Figure 22:
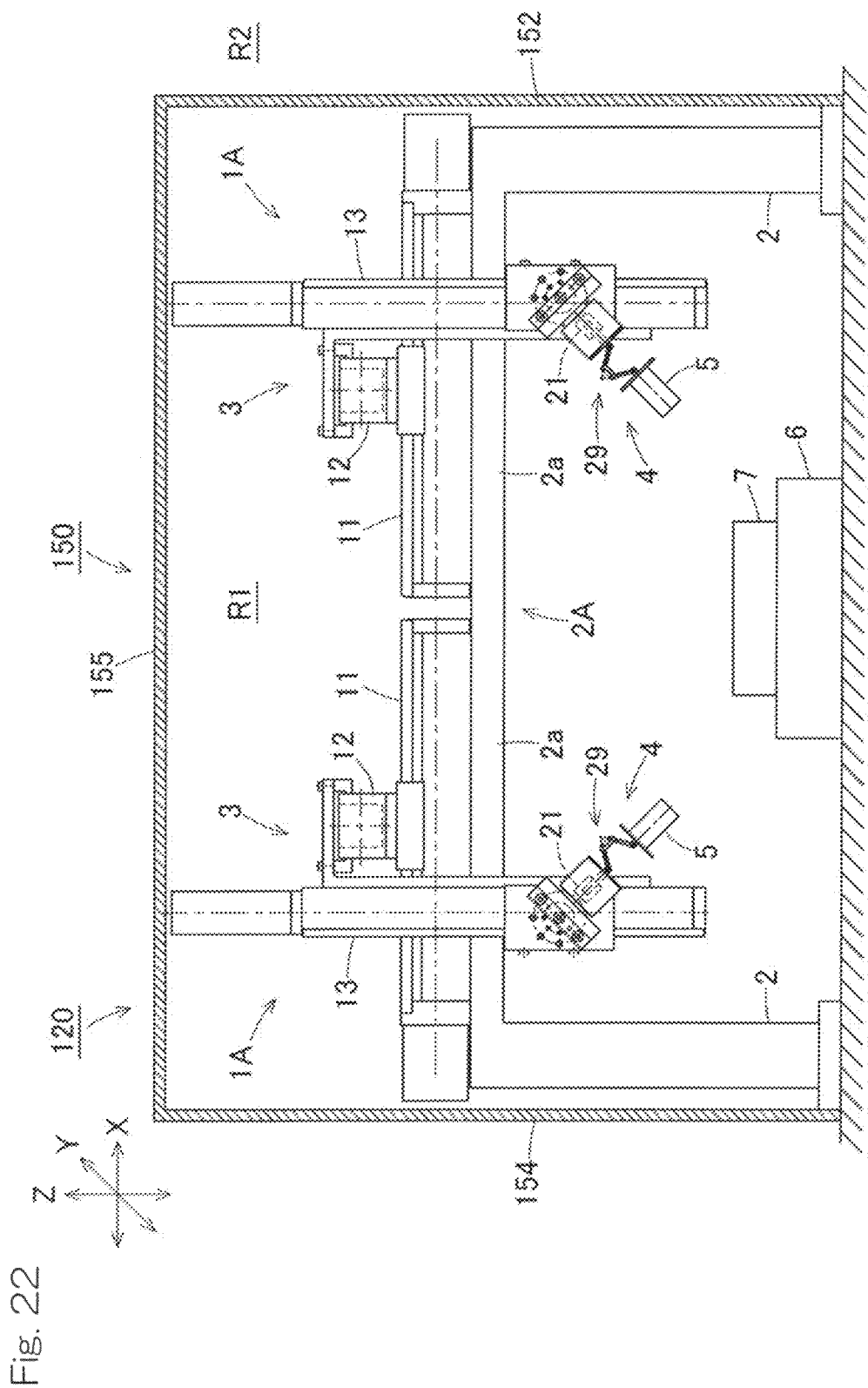
FIG. 22 is a front view representing a part of a dual-arm work device according to a sixth embodiment of the present invention in a cross-section.
Figure 23:
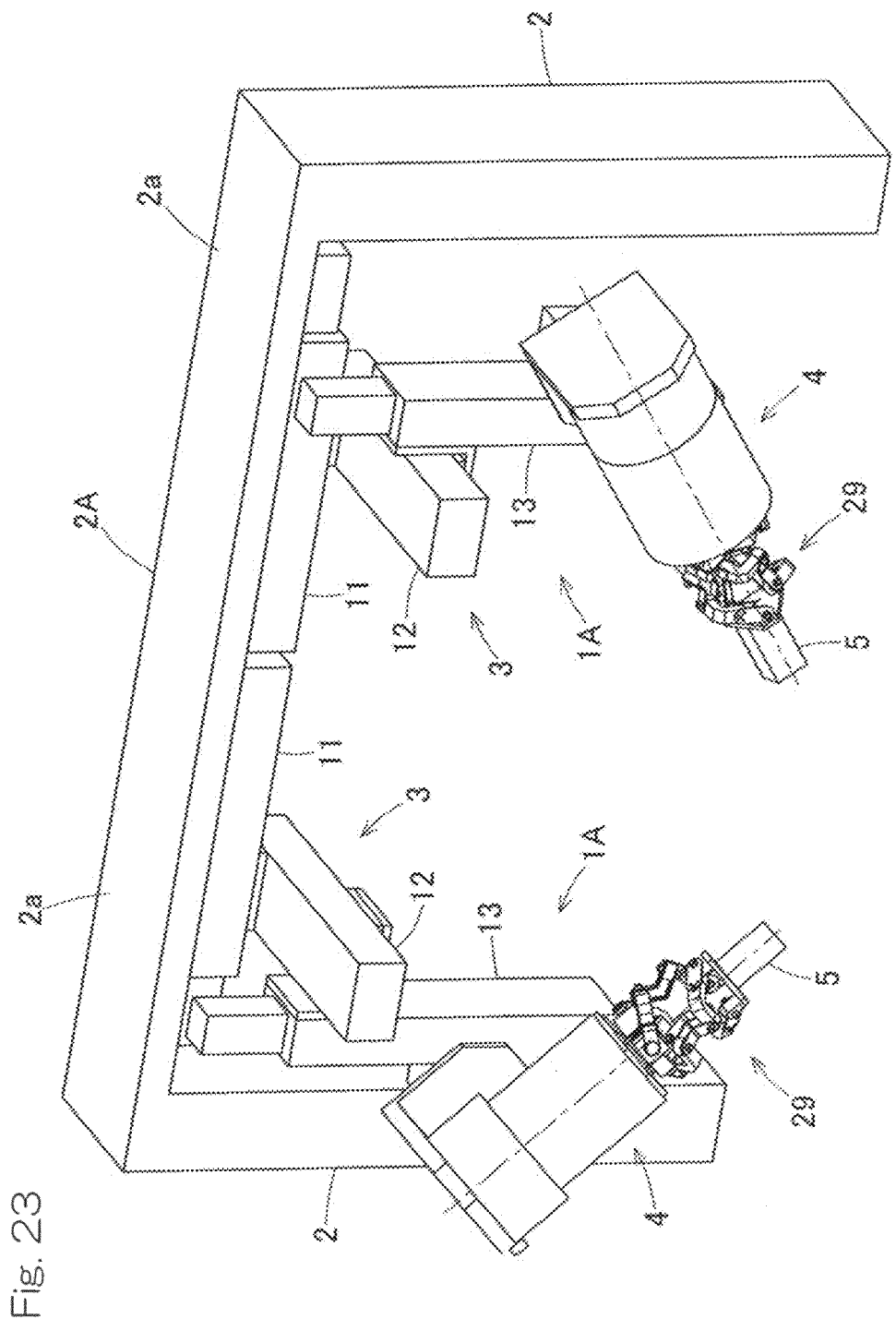
FIG. 23 is a perspective view of work device bodies of the dual-arm work device.

As shown in the front view of FIG. 22 and a perspective view of FIG. 23, the two work device bodies 1A, 1A are aligned so as to be geometrically symmetrical with each other. The mounts 2, 2 of the two work device bodies 1A, 1A form a gate-shaped mount 2A as a whole in which tip ends of the horizontal portions 2a, 2a of the mounts 2, 2 are connected to each other. In this embodiment, the work device body 1A of the fourth embodiment shown in FIG. 18 is used. However, the work device body of another embodiment may be used.

By configuring a dual-arm type in which the two work device bodies 1A are aligned as described above, it is possible to perform work that is performed with both hands by a person. Accordingly, work that is performed as a substitute for a person, in particular, work such as assembly of components, can be performed.

When the two work device bodies 1A, 1A are installed on the gate-shaped mount 2A, a workpiece 7 to be worked on can be passed below the work device bodies 1A, 1A. For example, a workpiece placement table 6 is configured as a conveyor device capable of conveying the workpiece 7 in a direction orthogonal to the sheet of FIG. 22, and the work device bodies 1A, 1A can be installed on a conveyor line of the conveyor device. In addition, the range of movement of the work device bodies 1A, 1A in the widthwise direction can be limited to a range within the width of the mount 2A. Thus, the occupation area of the work device bodies 1A, 1A can be reduced.

Furthermore, since the range of movement of the work device bodies 1A, 1A is limited, a possibility of an object coming into contact with any of the work device bodies 1A, 1A is decreased.

Figure 24A:
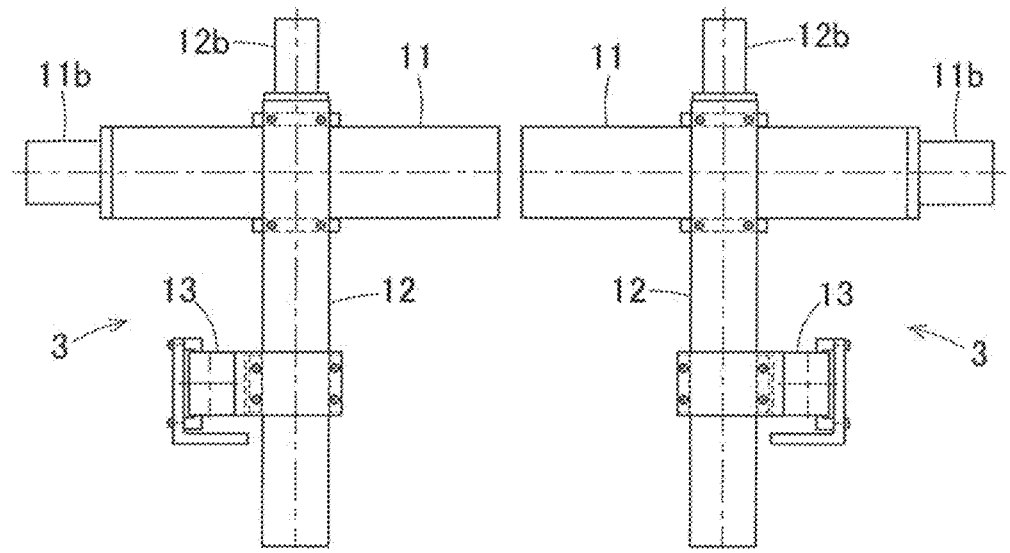
FIG. 24A is a plan view of linear motion units of the work device bodies.

FIG. 24A is a plan view of the respective linear motion units 3, 3 of the two work device bodies 1A. In each of these linear motion units 3, 3, similar to the linear motion unit 3 of each work device body 1A shown in FIG. 1, FIG. 10 and FIG. 18, the respective motors 11b and 12b of the first linear motion actuator 11 and the second linear motion actuator 12 are disposed on the axes of the linear motion actuators 11 and 12.

Figure 24B:
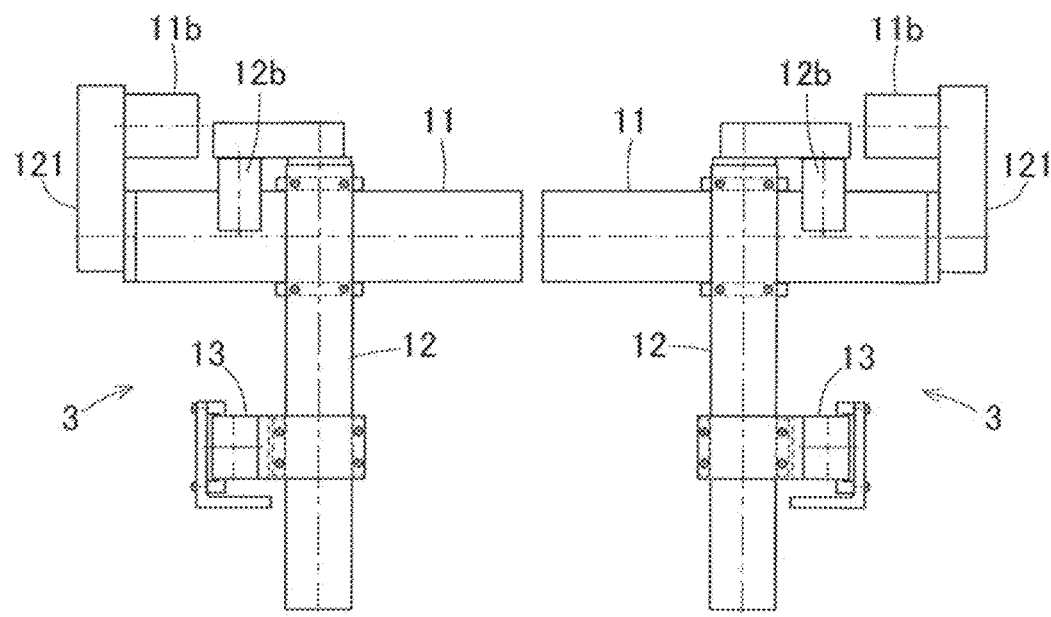
FIG. 24B is a plan view of another form of the linear motion units of the work device bodies.

FIG. 24B is a plan view showing another example of the linear motion units 3, 3. In each of these linear motion units 3, 3, the respective motors 11b and 12b of the first linear motion actuator 11 and the second linear motion actuator 12 are disposed at positions shifted from the axes of the linear motion actuators 11 and 12. In the case of the example shown in FIG. 24B, rotations of the motors 11b and 12b are transmitted to drive portions of the linear motion actuators 11 and 12 via power transmission means 121 such as chains.

Each linear motion unit 3 can be changed to the configuration shown in FIG. 24A or the configuration shown in FIG. 24B according to the specifications of the dual-arm work device 120. Since the linear motion units 3 and the rotary units 4 are separately provided, such configuration change is easy.

Figure 25:
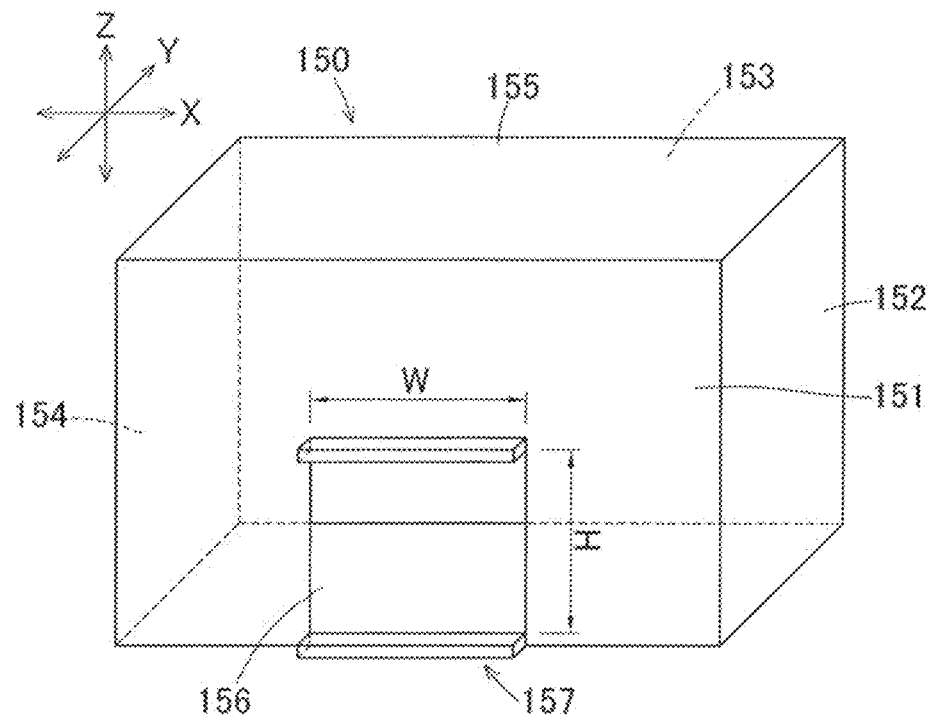
FIG. 25 is an external perspective view of a contact preventer, composed of a cover, of the dual-arm work device.

FIG. 25 is a perspective view of the cover 150. The cover 150 includes four erected face members (face members) 151, 152, 153 and 154 and one top face member (face member) 155 that are disposed such that two adjacent face members are orthogonal to each other. That is, the cover 150 has a rectangular parallelepiped shape that is open downward. As shown in FIG. 22, the cover 150 surrounds the two work device bodies 1A, 1A. Accordingly, a working region R1, which is a space in which the work device bodies 1A, 1A are installed, is separated from a non-working region R2 that is a space outside the working region R1.

The four erected face members 151 to 154 (FIG. 25) and the one top face member 155 of the cover 150 are each installed so as to be parallel to two of the movable directions of the three linear motion actuators 11, 12 and 13 (FIG. 22) of the work device body 1A. Specifically, the erected face members 151 and 153 are parallel to the movable directions of the first linear motion actuator 11 and the third linear motion actuator 13 (an X-axis direction, a Z-axis direction). The erected face members 152 and 154 are parallel to the movable directions of the second linear motion actuator 12 and the third linear motion actuator 13 (a Y-axis direction, and the Z-axis direction). The top face member 155 is parallel to the movable directions of the first linear motion actuator 11 and the second linear motion actuator 12 (the X-axis direction, the Y-axis direction).

An entry allowing portion 156, that allows an object or a hand of an operator to enter the working region R1 therethrough from the non-working region R2, is provided in a lower portion of the erected face member 151 at the front. The entry allowing portion 156 is composed of a rectangular opening. The height dimension H of the entry allowing portion 156 is smaller than the range of movement of the third linear motion actuator 13 (the effective stroke sZ (FIG. 2A)). In addition, the width dimension W of the entry allowing portion 156 is smaller than the range of movement of the first linear motion actuators 11 (an effective stroke sx+sx (FIG. 2B)).

An entry allowing portion entry detection sensor 157, which detects entry of an object into the working region R1 through the entry allowing portion 156, is provided to the entry allowing portion 156. The entry detection sensor 157 is, for example, a sensor of the same type as the entry detection sensor 137 of the single-arm work device 1, and is electrically connected to a control device (not shown). Similar to the single-arm work device 1, the control device controls each of the motors of the linear motion units 3 and the rotary units 4 in accordance with a detection signal from the entry detection sensor 157. Accordingly, work of carrying the workpiece 7 into/out of the working region R1 or assisting work for each work device body 1A can be easily performed.

Each of the four erected face members 151 to 154 and the one top face member 155 is parallel to two movable directions of the movable directions of the three linear motion actuators 11 to 13. Thus, the volume of the internal space of the cover 150 and the volume of a region where movable portions move can be substantially equal to each other. Accordingly, the configuration of the contact preventer including the cover 150 can be compact. In addition, an object does not come into contact with any work device body 1A through a portion other than the entry allowing portion 156. Therefore, contact between an object and any work device body 1A can be assuredly prevented.

Furthermore, the height dimension H of the entry allowing portion 156 is set to be smaller than the range of movement of the third linear motion actuator 13 (the effective stroke sZ), and the width dimension W of the entry allowing portion 156 is set to be smaller than the range of movement of the first linear motion actuators 11 (the effective stroke sx+sx). Thus, an object is less likely to enter between the cover 150 and any work device body 1A.

Figure 26:
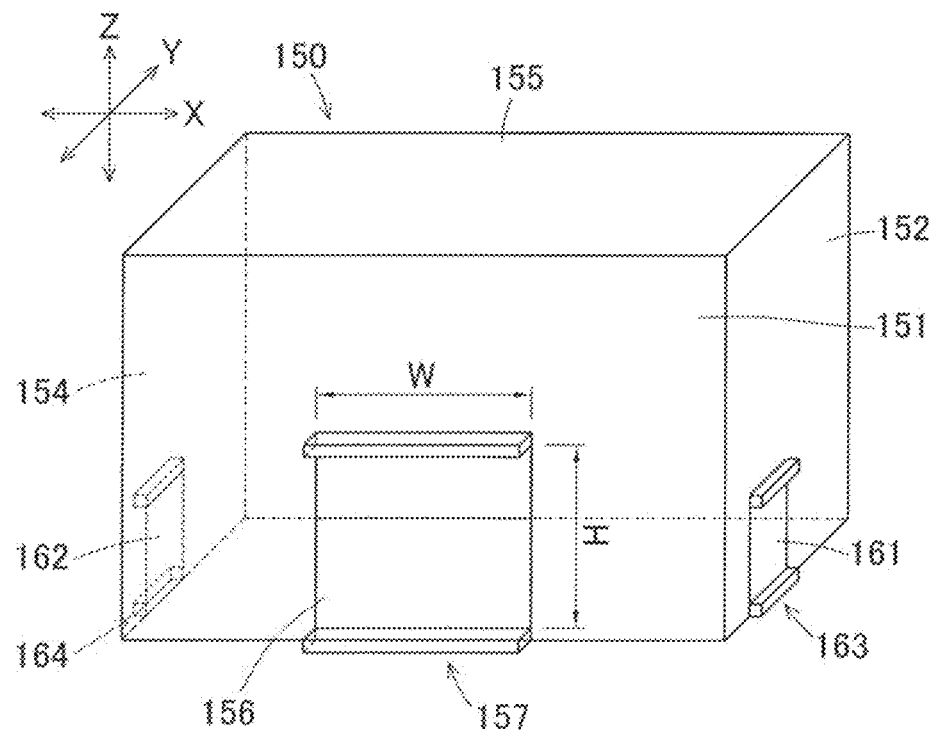
FIG. 26 is an external perspective view of another contact preventer composed of a cover.

FIG. 26 shows another example of the cover. The cover 150 is provided with two workpiece carrying-in/out portions 161 and 162, in addition to the entry allowing portion 156. The two workpiece carrying-in/out portions 161 and 162 are provided in lower portions of the erected face members 152 and 154, respectively, which are orthogonal to the erected face member 151 at the front provided with the entry allowing portion 156 and face each other. The two workpiece carrying-in/out portions 161 and 162 are provided such that the positions thereof coincide with each other in the front-rear direction (the Y-axis direction) and the vertical direction (the Z-axis direction).

When the workpiece carrying-in/out portions 161 and 162 are provided, a device for carrying a workpiece into/out of the working region R1 (FIG. 22) within the cover 150 (for example, a conveyor device) can be installed so as to extend through the workpiece carrying-in/out portions 161 and 162. The work device bodies 1A, 1A (FIG. 22) can be installed on a line of the conveyor device.

Workpiece carrying-in/out portion entry detection sensors 163 and 164, each of which detects entry of an object into the working region R1 through the workpiece carrying-in/out portion 161 or 162, may be provided to the workpiece carrying-in/out portions 161 and 162. Accordingly, by performing control similar to the case of the single-arm work device 1 (FIG. 6), it is possible to detect an abnormal situation in which an object has entered the working region R1 through the workpiece carrying-in/out portion 161 or 162. Therefore, it is possible to take prompt action of stopping an operation cycle of the work device bodies 1A, 1A.

Although the present invention has been described above in connection with the preferred embodiments thereof with reference to the accompanying drawings, the present invention is not limited to the above-described embodiments, and numerous additions, changes, or deletions can be made without departing from the gist of the present invention.

Accordingly, such additions, changes, or deletions are to be construed as included in the scope of the present invention.

REFERENCE NUMERALS

1 . . . work device
1A . . . work device body
2 . . . mount
3 . . . linear motion unit
4 . . . rotary unit
5 . . . end effector
11 . . . first linear motion actuator
11a . . . stage
12 . . . second linear motion actuator
12a . . . stage
13 . . . third linear motion actuator
13a . . . stage
21 . . . first rotating mechanism
22 . . . second rotating mechanism
23 . . . third rotating mechanism
23a . . . rotating portion (output portion of rotary unit)
29 . . . link actuating device
31 . . . posture control actuator
32 . . . proximal end side link hub
33 . . . distal end side link hub (output portion of rotary unit)
34 . . . link mechanism
35 . . . proximal side end link member
36 . . . distal side end link member
37 . . . intermediate link member
82 . . . protective cover (entry prevention cover)
83 . . . internal space
85 . . . protective cover (cushioning material)
120 . . . dual-arm work device
130 . . . cover (contact preventer)
131, 132, 133, 134 . . . erected face member (face member)
135 . . . top face member (face member)
136 . . . entry allowing portion
137 . . . entry allowing portion entry detection sensor
138 . . . control device
141, 142 . . . workpiece carrying-in/out portion
143, 144 . . . workpiece carrying-in/out portion entry detection sensor
150 . . . cover (contact preventer)
151, 152, 153, 154 . . . erected face member (face member)
155 . . . top face member (face member)
156 . . . entry allowing portion
157 . . . entry allowing portion entry detection sensor
161, 162 . . . workpiece carrying-in/out portion
163, 164 . . . workpiece carrying-in/out portion entry detection sensor
170 . . . contact preventer
202 . . . contact detector
203 . . . torque detector
R1 . . . working region
R2 . . . non-working region
S . . . working space

What is claimed is:

1. A work device having six degrees of freedom and configured to perform work using an end effector, the work device comprising:

a work device body; and a contact preventer configured to prevent an object from needlessly coming into contact with the work device body, wherein the work device body includes:
  a linear motion unit having three degrees of freedom and obtained by combining three linear motion actuators, and
  a rotary unit having three degrees of freedom and obtained by combining a plurality of rotating mechanisms each having one or more rotational degrees of freedom, wherein the plurality of rotating mechanisms include:
  a link actuating device having two degrees of freedom and including a proximal end side link hub and a distal end side link hub coupled to the proximal end side link hub via three or more link mechanisms such that a posture of the distal end side link hub can be changed relative to the proximal end side link hub, and
  a first rotating mechanism, disposed between a base portion of the rotary unit and the proximal end side link hub, having a rotation axis which passes through a center of the proximal end side link hub,
  the linear motion unit has a base portion fixed to a mount, the base portion of the rotary unit is fixed to an output portion of the linear motion unit, and the end effector is mounted on an output portion of the rotary unit,
  the contact preventer separates a working region, that is a space in which the work device body is installed, from a non-working region that is a space outside the working region, and
  the contact preventer has an entry allowing portion allowing the object to enter the working region therethrough from the non-working region, and an entry detection sensor configured to detect entry of the object into the working region through the entry allowing portion.

2. The work device as claimed in claim 1, wherein
the contact preventer includes a plurality of face members,
the plurality of face members form a cover surrounding the work device body, and
each of the plurality of face members is parallel to two movable directions of three movable directions of the three linear motion actuators.

3. The work device as claimed in claim 1, wherein lengths of the entry allowing portion in movable directions of two linear motion actuators parallel to a plane on which the entry allowing portion is present are smaller than ranges of movement of the two linear motion actuators, respectively.

4. The work device as claimed in claim 1, wherein
each of the link mechanisms has a proximal side end link member having one end rotatably coupled to the proximal end side link hub, a distal side end link member having one end rotatably coupled to the distal end side link hub, and an intermediate link member having opposite ends rotatably coupled to other ends of the proximal side and distal side end link members, respectively, and
a posture control actuator configured to arbitrarily change the posture of the distal end side link hub relative to the proximal end side link hub is provided to each of two or more link mechanisms of the three or more link mechanisms.

5. The work device as claimed in claim 4, wherein the posture control actuator has a torque detector,
further comprising a contact detector configured to detect contact of the object with the rotary unit on the basis of a detection signal from the torque detector.

6. The work device as claimed in claim 4, further comprising an entry prevention cover configured to prevent the object from entering an internal space between the proximal end side link hub and the distal end side link hub.

7. The work device as claimed in claim 1, further comprising a cushioning material provided to the rotary unit, the cushioning material alleviating shock when coming into contact with the object.

8. The work device as claimed in claim 1, wherein each of the linear motion actuators of the linear motion unit has a stage including an advancing/retracting portion, wherein each stage is disposed so as to be directed toward an outer side with respect to a working space in which work is performed by the end effector.

9. The work device as claimed in claim 1, further comprising a control device configured to perform control so as to decrease an operation speed of the work device body or stop operation of the work device body when the entry detection sensor detects entry of the object into the working region.

10. The work device as claimed in claim 1, the contact preventer includes:
  at least one workpiece carrying-in/out portion configured to carry in/out a workpiece between the working region and the non-working region; and
  a workpiece carrying-in/out portion entry detection sensor configured to detect entry of the object into the working region through the workpiece carrying-in/out portion.

11. The work device as claimed in claim 1, wherein the three linear motion actuators include:
  a first linear motion actuator having a stage which advances and retracts in a first horizontal direction,
  a second linear motion actuator having a stage which advances and retracts in a second horizontal direction, and
  a third linear motion actuator having a stage which advances and retracts in a vertical direction, wherein the stage of the third linear motion actuator corresponds to the output portion of the linear motion unit to which the base portion of the rotary unit is fixed.

12. The work device as claimed in claim 11, wherein the rotary unit is mountable to the stage of the third linear motion actuator via a plurality of bolts insertable into coupling holes arranged in a circular pattern on the stage of the third linear motion actuator such that an angle at which the rotary unit is mounted to the stage of the third linear motion actuator is adjustable.

13. The work device as claimed in claim 1, wherein
the contact preventer includes a cover having a plurality of openings, the plurality of openings including a first opening through which a workpiece is insertable into the working region or through which the workpiece is removable from the working region to the non-working region, and a second opening corresponding to the entry allowing portion,
when the work device body is operating and the object enters the working region through the first opening, another entry detection sensor is configured to detect entry of the object into the working region and operation of the work device body is stopped, and
when the work device body is operating and the object enters the working region through the second opening, the entry detection sensor is configured to detect entry of the object into the working region and operation of the work device body is decelerated without stopping the work device body.

14. A dual-arm work device comprising:

two work device bodies each having six degrees of freedom and configured to perform work by using an end effector, the two work device bodies being aligned so as to be geometrically symmetrical with each other; and a contact preventer configured to prevent an object from needlessly coming into contact with any of the two work device bodies, wherein each of the work device bodies includes:

a linear motion unit having three degrees of freedom and obtained by combining three linear motion actuators, and a rotary unit having three degrees of freedom and obtained by combining a plurality of rotating mechanisms each having one or more rotational degrees of freedom, wherein the plurality of rotating mechanisms include:

a link actuating device having two degrees of freedom and including a proximal end side link hub and a distal end side link hub coupled to the proximal end side link hub via three or more link mechanisms such that a posture of the distal end side link hub can be changed relative to the proximal end side link hub, and a first rotating mechanism, disposed between a base portion of the rotary unit and the proximal end side link hub, having a rotation axis which passes through a center of the proximal end side link hub, the linear motion unit has a base portion fixed to a mount, the base portion of the rotary unit is fixed to an output portion of the linear motion unit, and the end effector is mounted on an output portion of the rotary unit, the contact preventer separates a working region, that is a space in which the two work device bodies are installed, from a non-working region that is a space outside the working region, and the contact preventer has an entry allowing portion allowing the object to enter the working region therethrough from the non-working region, and an entry detection sensor configured to detect entry of the object into the working region through the entry allowing portion.

\* \* \* \* \*

UNITED STATES PATENT AND TRADEMARK OFFICE
CERTIFICATE OF CORRECTION

| | |
|---|---|
| PATENT NO. | : 11,247,329 B2 |
| APPLICATION NO. | : 16/217474 |
| DATED | : February 15, 2022 |
| INVENTOR(S) | : Hiroshi Isobe et al. |

It is certified that error appears in the above-identified patent and that said Letters Patent is hereby corrected as shown below:

On the Title Page

Item (73), Line 1, Delete "CORPORTION," and insert --CORPORATION,--.

Signed and Sealed this
Eleventh Day of October, 2022

Katherine Kelly Vidal
*Director of the United States Patent and Trademark Office*